United States Patent
Ikawa et al.

(10) Patent No.: US 10,605,479 B2
(45) Date of Patent: Mar. 31, 2020

(54) AIR-CONDITIONING SYSTEM

(71) Applicant: DAIKIN INDUSTRIES, LTD., Osaka-shi, Osaka (JP)

(72) Inventors: Shinsuke Ikawa, Osaka (JP); Katsunori Murata, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 74 days.

(21) Appl. No.: 15/757,242

(22) PCT Filed: Aug. 31, 2016

(86) PCT No.: PCT/JP2016/075568
§ 371 (c)(1),
(2) Date: Mar. 2, 2018

(87) PCT Pub. No.: WO2017/038896
PCT Pub. Date: Mar. 9, 2017

(65) Prior Publication Data
US 2018/0283725 A1 Oct. 4, 2018

(30) Foreign Application Priority Data
Sep. 4, 2015 (JP) ................................. 2015-175040

(51) Int. Cl.
*F24F 11/89* (2018.01)
*F24F 11/36* (2018.01)
(Continued)

(52) U.S. Cl.
CPC ............ *F24F 11/89* (2018.01); *F24F 1/0007* (2013.01); *F24F 3/14* (2013.01); *F24F 11/36* (2018.01);
(Continued)

(58) Field of Classification Search
CPC ...... F24F 1/0007; F24F 11/0001; F24F 11/36; F24F 11/74; F24F 11/77; F24F 11/89; F25B 2500/22; F25B 2500/222
See application file for complete search history.

(56) References Cited

U.S. PATENT DOCUMENTS

| 2013/0098576 A1 | 4/2013 | Fujitaka et al. | |
| 2016/0146488 A1* | 5/2016 | Ochiai | F25B 13/00 62/125 |
| 2017/0198936 A1* | 7/2017 | Yamaguchi | F24F 11/74 |

FOREIGN PATENT DOCUMENTS

| EP | 1 083 392 A2 | 3/2001 |
| EP | 3260791 A1 | 12/2017 |

(Continued)

OTHER PUBLICATIONS

International Search Report (PCT/ISA/210) issued in PCT/JP2016/075568, dated Nov. 1, 2016.

*Primary Examiner* — Marc E Norman
(74) *Attorney, Agent, or Firm* — Birch, Stewart, Kolasch & Birch, LLP

(57) ABSTRACT

An air-conditioning system having exceptional security is provided. An air-conditioning system comprises a plurality of indoor units installed in a target space, a controller configured and arranged to control the actions of the plurality of indoor units, and a refrigerant leakage sensor configured and arranged to sense refrigerant leakage in the target space. Each of the indoor units has indoor fan. When the refrigerant leakage sensor has sensed refrigerant leakage, the controller configured and arranged to cause the indoor fan of the indoor unit that has received a refrigerant leakage signal to be driven at a predetermined first rotation speed, and cause the indoor fan of other indoor unit (emergency (Continued)

group indoor units) belonging to the same group as the aforementioned indoor unit to be driven at a predetermined second rotation speed.

16 Claims, 16 Drawing Sheets

(51) Int. Cl.
    *F24F 11/74*     (2018.01)
    *F24F 11/77*     (2018.01)
    *F24F 11/54*     (2018.01)
    *F24F 1/0007*     (2019.01)
    *F24F 3/14*     (2006.01)
    *F25B 49/02*     (2006.01)
    *F24F 11/00*     (2018.01)

(52) U.S. Cl.
    CPC .............. *F24F 11/54* (2018.01); *F24F 11/74* (2018.01); *F24F 11/77* (2018.01); *F25B 49/027* (2013.01); *F24F 11/0001* (2013.01); *F25B 2500/222* (2013.01)

(56) References Cited

FOREIGN PATENT DOCUMENTS

| | | |
|---|---|---|
| JP | 7-027395 A | 1/1995 |
| JP | 2001-074283 A | 3/2001 |
| JP | 2012-013348 A | 1/2012 |
| JP | 2012-184868 A | 9/2012 |
| WO | WO 2016/132906 A1 | 8/2016 |
| WO | WO 2017/038896 A1 | 3/2017 |

\* cited by examiner

GROUPING TABLE TB1

|  | VARIABLE | VALUE |
| --- | --- | --- |
| INDOOR UNIT 30a | UNIT NUMBER | 1 |
|  | GROUP NUMBER | 1 |
|  | EMERGENCY GROUP NUMBER | 3 |
| INDOOR UNIT 30b | UNIT NUMBER | 1 |
|  | GROUP NUMBER | 2 |
|  | EMERGENCY GROUP NUMBER | 3 |
| INDOOR UNIT 30c | UNIT NUMBER | 1 |
|  | GROUP NUMBER | 2 |
|  | EMERGENCY GROUP NUMBER | 3 |

FIG. 8

GROUPING TABLE TB2

|  | VARIABLE | VALUE |
|---|---|---|
| INDOOR UNIT | UNIT NUMBER | 1 |
|  | GROUP NUMBER | 1 |
|  | EMERGENCY GROUP NUMBER | 5 |
| VENTILATOR | UNIT NUMBER | 2 |
|  | GROUP NUMBER | 2 |
|  | EMERGENCY GROUP NUMBER | 5 |
| AIR PURIFIER | UNIT NUMBER | 3 |
|  | GROUP NUMBER | 3 |
|  | EMERGENCY GROUP NUMBER | 5 |
| DEHUMIDIFIER | UNIT NUMBER | 4 |
|  | GROUP NUMBER | 4 |
|  | EMERGENCY GROUP NUMBER | 5 |

FIG. 16

AIR-CONDITIONING SYSTEM

TECHNICAL FIELD

The present invention relates to an air-conditioning system.

BACKGROUND ART

Conventionally, there have been proposed air-conditioning indoor unit configuring refrigerant circuit, the air-conditioning indoor unit having a refrigerant leakage sensor that senses refrigerant that has leaked into a target space (leaked refrigerant), and an air blower being forcibly operated in order to disperse the leaked refrigerant when refrigerant leakage has occurred. For example, the air-conditioning indoor unit disclosed in Patent Literature 1 (Japanese Laid-open Patent Publication No. 2012-13348) has a temperature sensor that senses the temperature distribution situation in a target space, and the air-conditioning indoor unit is configured so that when the refrigerant leakage sensor senses refrigerant leakage, the air blower is driven, and the airflow direction is adjusted to an area other than a high-temperature area in order to suppress accumulation of leaked refrigerant in the high-temperature area.

SUMMARY OF THE INVENTION

Technical Problem

According to Patent Literature 1, there are cases envisioned in which the leaked refrigerant is not properly dispersed depending on the manner in which the air-conditioning indoor unit is installed and/or the size of the target space, and security is not sufficiently guaranteed. For example, when a plurality of air-conditioning indoor units are placed in the same target space and the only countermeasure taken is to drive the air blower of the air-conditioning indoor unit in which a signal has been outputted from the refrigerant leakage sensor that sensed the refrigerant leakage, there is a possibility that the leaked refrigerant accumulates and the concentration thereof increases in the spaces near the position where the other air-conditioning indoor unit is installed. Additionally, there is a possibility that the leaked refrigerant flows also into spaces other than the target space where the refrigerant leakage occurred, and a refrigerant leakage detection sensor is not placed in these spaces. In these cases, security is not guaranteed when the leaked refrigerant is, e.g., a refrigerant of flammability such as R32, a flammable refrigerant such as propane, or a toxic refrigerant such as ammonia.

An object of the present invention is to provide an air-conditioning system having exceptional security.

Solution to Problem

An air-conditioning system according to a first aspect of the present invention comprises a plurality of air-conditioning indoor units, a controller, and a refrigerant leakage sensor. The air-conditioning indoor unit includes a first indoor unit. The first indoor unit is installed in a target space. The controller is configured and arranged to control the actions of the plurality of air-conditioning indoor units. The refrigerant leakage sensor senses refrigerant leakage in the target space. Each of the air-conditioning indoor units has an air blower. The controller is configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage.

In the air-conditioning system according to the first aspect of the present invention, the controller is configured and arranged to cause the air blower of the first indoor unit to be driven at a predetermined first rotation speed and the air blower of air-conditioning indoor unit other than the first indoor unit to be driven at a predetermined second rotation speed when the refrigerant leakage sensor has sensed refrigerant leakage. Due to these actions, when refrigerant leakage has occurred in the target space, not only is the air blower of the first indoor unit driven, but the air blower is driven at a predetermined speed in other air-conditioning indoor unit included in the system. As a result, leaked refrigerant is dispersed by a plurality of generated air flows. Therefore, leaked refrigerant dispersal is facilitated in the target space, and accumulation of leaked refrigerant in some of the target space can be suppressed. Specifically, increases in leaked refrigerant concentration in specific sections of the target space can be suppressed. Additionally, even when leaked refrigerant flows into spaces other than the target space, the air blower of the air-conditioning unit placed in such spaces can be driven to disperse the leaked refrigerant, and increases in leaked refrigerant concentration in these spaces can be suppressed. Therefore, exceptional security relating to refrigerant leakage is realized.

There are no particular limitations as to the refrigerant used in the "refrigerant circuit" in this aspect; e.g., a refrigerant of flammability such as R32, a flammable refrigerant such as propane, or a toxic refrigerant such as ammonia is envisioned.

The "air-conditioning indoor unit" is such as air conditioners, air purifiers, ventilators, dehumidifiers, and a variety of other devices which are installed in the target space and the air blowers of which are driven to perform air conditioning.

The "first rotation speed" and the "second rotation speed" may be the same speed or different speeds.

An air-conditioning system according to a second aspect of the present invention is the air-conditioning system according to the first aspect, further comprising an outdoor unit. The outdoor unit is placed outside of the target space. The plurality of air-conditioning indoor units including the first indoor unit are connected with the outdoor unit via refrigerant interconnection pipes. The plurality of air-conditioning indoor units are configured and arranged to form a refrigerant circuit together with the outdoor unit. It is thereby possible for security to be ensured in a so-called "multi-type" air-conditioning system in which a refrigerant circuit is configured by an outdoor unit and the plurality of air-conditioning indoor units.

An air-conditioning system according to a third aspect of the present invention is the air-conditioning system according to the first or second aspect, further comprising a first outdoor unit and a second outdoor unit. The first outdoor unit and the second outdoor unit include an outdoor heat exchanger. The outdoor heat exchanger is configured and arranged to function as a condenser or evaporator of refrigerant. The first indoor unit is connected with the first outdoor unit via a first refrigerant interconnection pipe. The first indoor unit is configured and arranged to form a first refrigerant circuit together with the first outdoor unit. The air-conditioning indoor unit other than the first indoor unit is connected with the second outdoor unit via a second refrigerant interconnection pipe. The air-conditioning indoor unit other than the first indoor unit is configured and arranged to form a second refrigerant circuit together with the second outdoor unit. It is thereby possible to ensure security in an air-conditioning system having a plurality of refrigerant systems.

An air-conditioning system according to a fourth aspect of the present invention is the air-conditioning system according to any of the first through third aspects, wherein the controller is configured and arranged to cause the air blowers of the air-conditioning indoor units installed in the target space to be driven when the refrigerant leakage sensor has sensed refrigerant leakage. Due to this action, when refrigerant leakage has occurred in the target space, air flows are generated in the plurality of air-conditioning indoor units, and leaked refrigerant is dispersed by the generated plurality of air flows. As a result, leaked refrigerant dispersal is facilitated in the target space, and accumulation of leaked refrigerant in some of the target space is suppressed. Specifically, increases in leaked refrigerant concentration in specific sections of the target space are suppressed.

An air-conditioning system according to a fifth aspect of the present invention is the air-conditioning system according to any of the first through fourth aspects, wherein the controller is configured and arranged to cause the air blowers of all of the air-conditioning indoor units to be driven when the refrigerant leakage sensor has sensed refrigerant leakage. Due to this action, when refrigerant leakage has occurred in the target space, air flows are generated in all of the air-conditioning indoor units, and leaked refrigerant is dispersed by the generated plurality of air flows. As a result, leaked refrigerant dispersal is facilitated in the target space, and accumulation of leaked refrigerant in some of the target space is suppressed. Additionally, when the air-conditioning indoor units are placed in a plurality of target spaces and leaked refrigerant flows from a target space where refrigerant leakage has occurred into another target space, in this other target space, the leaked refrigerant is dispersed by the driving of the air blowers of the air-conditioning units and accumulation of the leaked refrigerant is suppressed.

An air-conditioning system according to a sixth aspect of the present invention is the air-conditioning system according to any of the first through third aspects, further comprising a remote controller. The remote controller is configured and arranged to be inputted by a user a command designating the air-conditioning indoor unit of which the air blower will be driven when refrigerant leakage occurs. The controller is configured and arranged to cause the air blower of the air-conditioning indoor unit designated in the command to be driven when the refrigerant leakage sensor has sensed refrigerant leakage. It is thereby possible to appropriately choose, in accordance with the environment where the system is installed, the air-conditioning indoor unit of which the air blower will be driven during refrigerant leakage. Consequently, versatility is exceptional.

An air-conditioning system according to a seventh aspect of the present invention is the air-conditioning system according to any of the first through third aspects, further comprising a switching part. The switching part is configured and arranged to select due to being mechanically switched by a user the air-conditioning indoor unit of which the air blower will be driven when refrigerant leakage occurs. The controller is configured and arranged to cause the air blower of the air-conditioning indoor unit selected in the switching part to be driven when the refrigerant leakage sensor has sensed refrigerant leakage. It is thereby possible to appropriately choose, in accordance with the environment where the system is installed, the air-conditioning indoor unit of which the air blower will be driven during refrigerant leakage. Consequently, versatility is exceptional.

Advantageous Effects of Invention

With the air-conditioning system according to the first aspect of the present invention, leaked refrigerant dispersal can be facilitated in the target space, and accumulation of leaked refrigerant in some of the target space can be suppressed. Specifically, increases in leaked refrigerant concentration in specific sections of the target space can be suppressed. Additionally, even when leaked refrigerant flows into spaces other than the target space, the air blowers of the air-conditioning units placed in such spaces can be driven to disperse the leaked refrigerant, and increases in leaked refrigerant concentration in these spaces can be suppressed. Therefore, exceptional security relating to refrigerant leakage is realized.

With the air-conditioning system according to the second aspect of the present invention, it is possible for security to be ensured in a "multi-type" air-conditioning system in which a refrigerant circuit is configured from the outdoor unit and the plurality of air-conditioning indoor units.

With the air-conditioning system according to the third aspect of the present invention, it is possible to ensure security in an air-conditioning system having a plurality of refrigerant systems.

With the air-conditioning system according to the fourth aspect of the present invention, increases in leaked refrigerant concentration in specific sections of the target space are suppressed.

With the air-conditioning system according to the fifth aspect of the present invention, when refrigerant leakage has occurred in the target space, air flows are generated in all of the air-conditioning indoor units, and the leaked refrigerant is dispersed by the generated plurality of air flows. As a result, leaked refrigerant dispersal is facilitated in the target space, and accumulation of leaked refrigerant in some of the target space is suppressed. Additionally, when the air-conditioning indoor units are placed in a plurality of target spaces and leaked refrigerant flows from a target space where refrigerant leakage has occurred into another target space, in this other target space, the leaked refrigerant is dispersed by the driving of the air blowers of the air-conditioning units and accumulation of the leaked refrigerant is suppressed.

With the air-conditioning system according to the sixth aspect of the present invention, it is possible to appropriately choose, in accordance with the environment where the system is installed, the air-conditioning indoor unit of which the air blower will be driven during refrigerant leakage. Consequently, versatility is exceptional.

With the air-conditioning system according to the seventh aspect of the present invention, it is possible to appropriately choose, in accordance with the environment where the system is installed, the air-conditioning indoor unit of which the air blower will be driven during refrigerant leakage. Consequently, versatility is exceptional.

BRIEF DESCRIPTION OF THE DRAWINGS

FIG. 8 is a schematic diagram showing an example of a grouping table used in coordinated control (group control) of the indoor units;

FIG. 16 is a schematic diagram showing an example of a grouping table in the fourth embodiment of the present invention.

DESCRIPTION OF EMBODIMENTS

First Embodiment

An air-conditioning system 100 according to a first embodiment of the present invention is described below. The following embodiment is a specific example of the present invention, is not limiting of the technical range of the present invention, and can be modified as appropriate as long as such change does not deviate from the scope of the present invention. In the following embodiment, the directions up, down, left, right, front, and back (rear) refer to the directions shown in FIGS. 2 and 4 through 6.

(1) Air-Conditioning System 100

Figure 1:
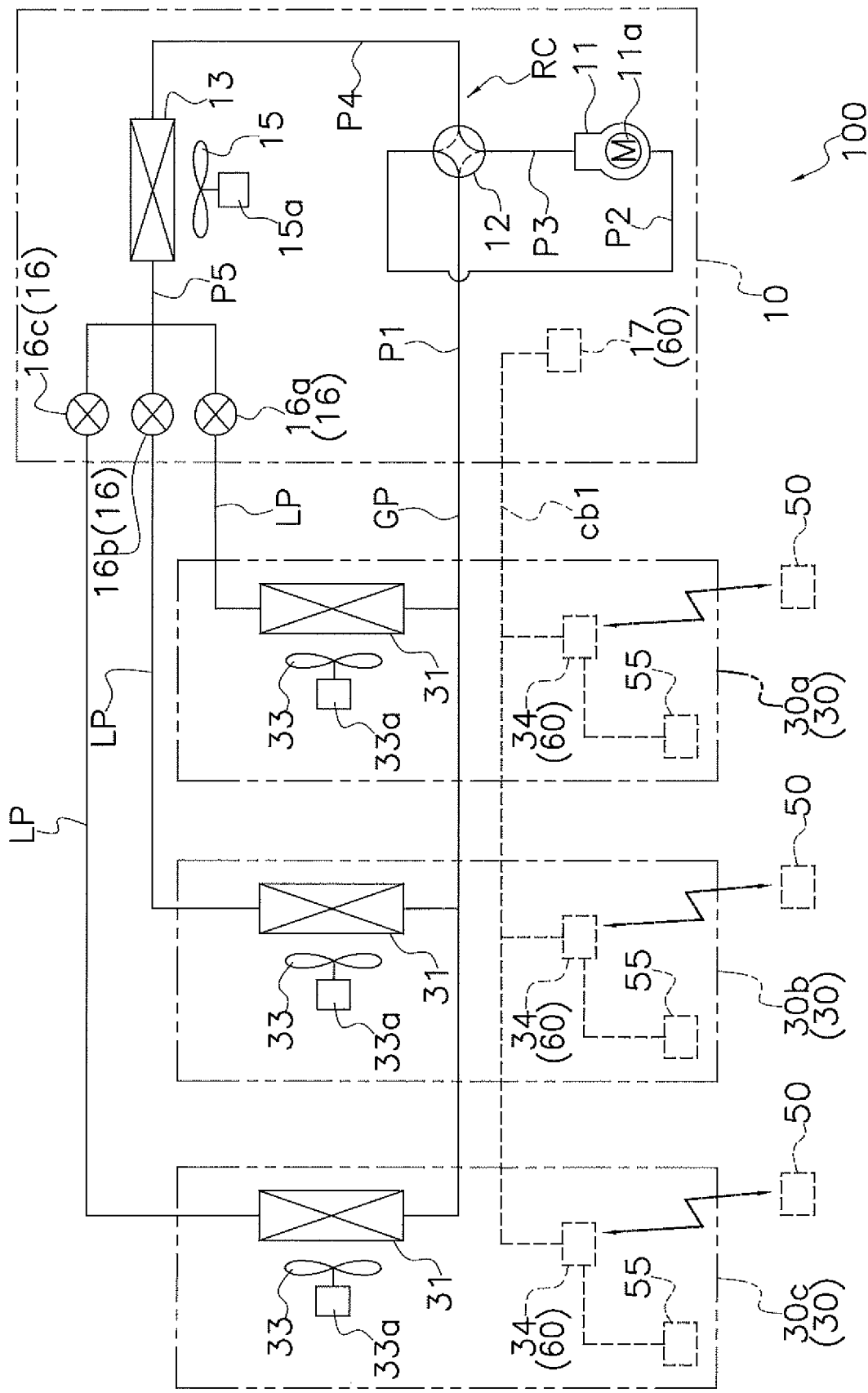
FIG. 1 is a schematic configuration diagram of an air-conditioning system according to a first embodiment of the present invention.

FIG. 1 is a schematic configuration diagram of the air-conditioning system 100. The air-conditioning system 100 is a system for realizing air-cooling, air-warming, and other forms of air-conditioning in a target space included in a house or the like.

The air-conditioning system 100 includes a refrigerant circuit RC, and by circulating a refrigerant within the refrigerant circuit RC to perform a vapor-compression refrigeration cycle, the air-conditioning system 100 performs air-cooling and air-warming in a target space SP. The air-conditioning system 100 is mainly provided with one outdoor unit 10 serving as a heat source unit, a plurality (three in this embodiment) of indoor units 30 (30a, 30b, 30c) serving as usage units, a plurality of remote controllers 50 serving as input devices, a plurality of refrigerant leakage sensors 55, a plurality of refrigerant leakage notification parts 58, and a controller 60.

In the air-conditioning system 100, the refrigerant circuit RC is configured by the outdoor unit 10 and the indoor units 30 being connected by a gas interconnection pipe GP and liquid interconnection pipes LP. Specifically, the air-conditioning system 100 is a "multi-type" air-conditioning system in which a plurality of indoor units 30 are connected to the same refrigerant system. The refrigerant sealed within the refrigerant circuit RC is e.g. a refrigerant having flammability such as R32, a flammable refrigerant such as propane, a toxic refrigerant such as ammonia or the like.

(1-1) Outdoor Unit 10 (Outdoor Unit)

The outdoor unit 10 is installed outdoors (outside of the target space SP). The outdoor unit 10 mainly has a plurality of refrigerant pipes (first pipe P1 to fifth pipe P5), a compressor 11, a four-way switching valve 12, an outdoor heat exchanger 13, an outdoor fan 15, a plurality of expansion valves 16 (16a, 16b, and 16c), and an outdoor unit control part 17.

The first pipe P1 is a refrigerant pipe connecting the gas interconnection pipe GP and the four-way switching valve 12. The second pipe P2 is an intake pipe connecting the four-way switching valve 12 and an intake port (not shown) of the compressor 11. The third pipe P3 is a discharge pipe connecting a discharge port (not shown) of the compressor 11 and the four-way switching valve 12. The fourth pipe P4 is a refrigerant pipe connecting the four-way switching valve 12 and a gas side of the outdoor heat exchanger 13. The fifth pipe P5 is a refrigerant pipe connecting a liquid side of the outdoor heat exchanger 13 and any of the expansion valves 16. More specifically, one end of the fifth pipe P5 is connected with the liquid side of the outdoor heat exchanger 13, and the other-end side is branched according to the number of expansion valves 16 and connected individually with each expansion valve 16.

The compressor 11 is a mechanism that takes in low-pressure gas refrigerant, and compresses and discharges the refrigerant. The compressor 11 has a sealed structure with a built-in compressor motor 11a. In the compressor 11, a rotary-type, scroll-type, or other type of compression element (not shown) accommodated inside a compressor casing (not shown) is driven, the drive source being the compressor motor 11a. The compressor motor 11a is controlled by an inverter during operation, and the rotation speed is adjusted depending on the situation. When driven, the compressor 11 takes refrigerant in from the intake port, and after compression, the compressor 11 discharges refrigerant from the discharge port.

The four-way switching valve 12 is a switching valve for switching the direction in which refrigerant flows in the refrigerant circuit RC. The four-way switching valve 12 is connected individually with the first pipe P1, the second pipe P2, the third pipe P3, and the fourth pipe P4. During an air-cooling operation, the four-way switching valve 12 switches the flow channels so that the first pipe P1 and the second pipe P2, and the third pipe P3 and the fourth pipe P4 are connected (refer to the solid lines of the four-way switching valve 12 in FIG. 1). During an air-warming operation, the four-way switching valve 12 switches the flow channels so that the first pipe P1 and the third pipe P3 are connected, and the second pipe P2 and the fourth pipe P4 are connected (refer to the dashed lines of the four-way switching valve 12 in FIG. 1).

The outdoor heat exchanger 13 is a heat exchanger that functions as a condenser or heat radiator of refrigerant during the air-cooling operation, and functions as an evaporator of refrigerant during the air-warming operation. The outdoor heat exchanger 13 includes heat transfer tubes (not shown) through which refrigerant flows, and heat transfer fins (not shown) that increase heat transfer area. The outdoor heat exchanger 13 is arranged so that during operation, heat exchange can take place between the refrigerant in the heat transfer tubes and the air flow generated by the outdoor fan 15.

The outdoor fan 15 is, e.g., a propeller fan. The outdoor fan 15 is connected to an output shaft of an outdoor fan motor 15a, and is driven in coordination with the outdoor fan motor 15a. When driven, the outdoor fan 15 generates an air flow that flows into the outdoor unit 10 from the exterior, passes through the outdoor heat exchanger 13, and flows out of the outdoor unit 10.

The expansion valves 16 are electrically actuated valves of which the valve openings can be adjusted. During operation, the expansion valves 16 are adjusted in opening degree as appropriate, in accordance with the situation, and the expansion valves 16 decompress the refrigerant in accordance with the opening degrees. Each expansion valve 16 corresponds to one of the indoor units 30. Specifically, the expansion valve 16a, which corresponds to the indoor unit 30a, is connected with the liquid interconnection pipe LP that is connected to the indoor unit 30a, and the opening degree of the expansion valve 16a is adjusted as appropriate in accordance with the operating situation of the indoor unit 30a. The expansion valve 16b, which corresponds to the indoor unit 30b, is connected to the liquid interconnection pipe LP that is connected to the indoor unit 30b, and the opening degree of the expansion valve 16b is adjusted as appropriate in accordance with the operating situation of the indoor unit 30b. The expansion valve 16c, which corresponds to the indoor unit 30c, is connected to the liquid interconnection pipe LP that is connected to the indoor unit 30c, and the opening degree of the expansion valve 16c is adjusted as appropriate in accordance with the operating situation of the indoor unit 30c.

The outdoor unit control part 17 is a microcomputer configured from a CPU, a memory and the like. The outdoor unit control part 17 controls the actions of actuators in the outdoor unit 10. The outdoor unit control part 17 is connected via a communication line cb1 with indoor unit control part 34 (described hereinafter) of each indoor units 30, and the control parts send and receive signals to and from each other.

(1-2) Indoor Units 30 (Air-Conditioning Indoor Units)

In the present embodiment, each indoor unit 30 (the indoor units 30a, 30b, and 30c) is a floor-standing air-conditioning indoor unit installed on a floor F1 of the target space SP. Each of the indoor units 30, together with the outdoor unit 10, configures the refrigerant circuit RC. Each indoor unit 30 mainly has an indoor heat exchanger 31, an indoor fan 33 (air blower), and an indoor unit control part 34.

The indoor heat exchangers 31 are heat exchangers that function as evaporators of refrigerant during the air-cooling operation, and function as condensers or heat radiators of refrigerant during the air-warming operation. The indoor heat exchangers 31 are "cross-fin-tube" heat exchangers. A liquid side of each indoor heat exchanger 31 is connected to a refrigerant pipe extending to a liquid interconnection pipe LP, and a gas side is connected to a refrigerant pipe extending to the gas interconnection pipe GP. The indoor heat exchangers 31 are arranged so that during operation, heat exchange can take place between the refrigerant in the heat transfer tubes (not shown) and an air flow AF (described hereinafter) generated by the indoor fans 33.

The indoor fans 33 are each, e.g., a turbo fan, a sirocco fan, a cross-flow fan, a propeller fan, or another air blower. The indoor fans 33 are each connected to an output shaft of an indoor fan motor 33a. The indoor fans 33 are driven in coordination with the indoor fan motors 33a. When driven, the indoor fans 33 each generate the air flow AF that is drawn into the indoor unit 30, and that is blown out into the target space SP after passing through the indoor heat exchanger 31.

The indoor unit control part 34 is a microcomputer configured from a CPU, a memory and the like. The indoor unit control part 34 controls the actions of actuators in the indoor unit 30. The indoor unit control part 34 sends and receives signals to and from the outdoor unit control part 17 via the communication line cb1. The indoor unit control part 34 also communicates wirelessly with the remote controllers 50. The indoor unit control part 34 is also electrically connected with the refrigerant leakage sensor 55, and the indoor unit control part 34 sends and receives signals to and from the sensor 55.

The details of the indoor unit 30 are described in a later section "(3) Details of indoor unit 30."

(1-3) Remote Controllers 50

The remote controllers 50 are user interfaces. Each of the remote controllers 50 has a remote controller control part (not shown) including a microcomputer configured from a CPU, a memory and the like. Also, each of the remote controllers 50 has a remote controller input part (not shown) including input keys for inputting various commands to the air-conditioning system 100.

The air-conditioning system 100 has the same number (three in this embodiment) of remote controllers 50 as the indoor units 30. The remote controller 50 corresponds one-to-one with each of the indoor units 30. The remote controller 50 uses infrared rays or radio waves to communicate wirelessly with the indoor unit control part 34 of the corresponding indoor unit 30. When a command is inputted to the remote controller input part by a user or a manager, the remote controller 50 sends a predetermined signal to the indoor unit control part 34 in accordance with the inputted command.

(1-4) Refrigerant Leakage Sensors 55

The refrigerant leakage sensors 55, which are each placed in a target space SP, are sensors to sense refrigerant leakage in the target space SP. In the present embodiment, publicly known generic sensor is used for the refrigerant leakage sensor 55. In the present embodiment, the refrigerant leakage sensor 55 is placed inside a casing 40 (described hereinafter) of the indoor unit 30 (see FIGS. 2 and 3).

The refrigerant leakage sensor 55 is electrically connected with the indoor unit control part 34 of the indoor unit 30 into which this refrigerant leakage sensor 55 is built. Upon detecting refrigerant that has leaked (leaked refrigerant), the refrigerant leakage sensor 55 outputs an electric signal indicating that refrigerant leakage is occurring (worded below as a "refrigerant leakage signal") to the indoor unit control part 34 to which this refrigerant leakage sensor 55 is connected.

(1-5) Refrigerant Leakage Notification Parts 58

The refrigerant leakage notification parts 58 are output parts for notifying the user when refrigerant leakage has occurred in the target space SP. In the present embodiment, the refrigerant leakage notification part 58 is light-emitting part, e.g., LED light or the like, that light up when a predetermined voltage is supplied. The refrigerant leakage notification parts 58 are each placed in the upper part of the front side of the casing 40 in the respective indoor unit 30.

(1-6) Controller 60

In the air-conditioning system 100, the outdoor unit control part 17 and the indoor unit control parts 34 of the respective indoor units 30 (30a, 30b, 30c) are connected via the communication line cb1, thereby configuring the controller 60, which control the actions of the air-conditioning system 100. The details of the controller 60 are described in the later section "(4) Details of controller 60."

(2) Operations of Air-Conditioning System 100

In any of the remote controllers 50, when an operation start command is inputted and control relating to the air-cooling operation or the air-warming operation is executed by the controller 60, the four-way switching valve 12 is switched to the predetermined state, and the compressor 11 and the outdoor fan 15 start up. The indoor unit 30 corresponding to the remote controller 50 to which the operation start command has been inputted (referred to below as the "operating indoor unit 30") goes into an operating state (a state in which the indoor fan 33 starts up).

(2-1) Air-Cooling Operation

During the air-cooling operation, the four-way switching valve 12 is switched to an air-cooling cycle state (the state shown by the solid lines of the four-way switching valve 12 in FIG. 1). When the actuators start up, the refrigerant is drawn into the compressor 11 via the second pipe P2 and compressed. The refrigerant discharged from the compressor 11 passes through the third pipe P3, the four-way switching valve 12, and the fourth pipe P4, and flows into the outdoor heat exchanger 13. Having flowed into the outdoor heat exchanger 13, the refrigerant exchanges heat with the air flow generated by the outdoor fan 15, and condenses. The refrigerant that has flowed out of the outdoor heat exchanger 13 passes through the fifth pipe P5, and flows into the expansion valve 16 corresponding to the operating indoor unit 30. Having flowed into the expansion valve 16, the refrigerant is decompressed in accordance with the opening degree of the expansion valve 16. The refrigerant that has flowed out of the expansion valve 16 passes through the liquid interconnection pipe LP and flows into the operating indoor unit 30.

Having flowed into the operating indoor unit 30, the refrigerant flows into the indoor heat exchanger 31, exchanges heat with the air flow AF generated by the indoor fan 33, and evaporates. The refrigerant that has flowed out of the indoor heat exchanger 31 passes through the gas interconnection pipe GP and flows into the outdoor unit 10.

The refrigerant that has flowed into the outdoor unit 10 passes through the first pipe P1, the four-way switching valve 12, and the second pipe P2, to be drawn back into the compressor 11 and compressed.

(2-2) Air-Warming Operation

During the air-warming operation, the four-way switching valve 12 is switched to an air-warming cycle state (the state shown by the dashed lines of the four-way switching valve 12 in FIG. 1). When the actuators start up, the refrigerant is drawn into the compressor 11 via the second pipe P2, and compressed. The refrigerant discharged from the compressor 11 passes through the third pipe P3, the four-way switching valve 12, the first pipe P1, and the gas interconnection pipe GP and flows into the operating indoor unit 30.

Having flowed into the operating indoor unit 30, the refrigerant flows into the indoor heat exchanger 31, exchanges heat with the air flow AF generated by the indoor fan 33, and condenses. The refrigerant that has flowed out of the indoor heat exchanger 31 passes through the liquid interconnection pipe LP, and flows into the outdoor unit 10.

Having flowed into the outdoor unit 10, the refrigerant flows into the expansion valve 16 corresponding to the operating indoor unit 30, and the refrigerant is decompressed in accordance with the opening degree of the expansion valve 16. The refrigerant that has flowed out of the expansion valve 16 passes through the fifth pipe P5 and flows into the outdoor heat exchanger 13. The refrigerant that has flowed into the outdoor heat exchanger 13 exchanges heat with the air flow generated by the outdoor fan 15, and evaporates. The refrigerant that has flowed out of the outdoor heat exchanger 13 passes through the fourth pipe P4, the four-way switching valve 12, and the second pipe P2, and the refrigerant is drawn back into the compressor 11 and compressed.

(3) Details of Indoor Unit 30

Figure 2:
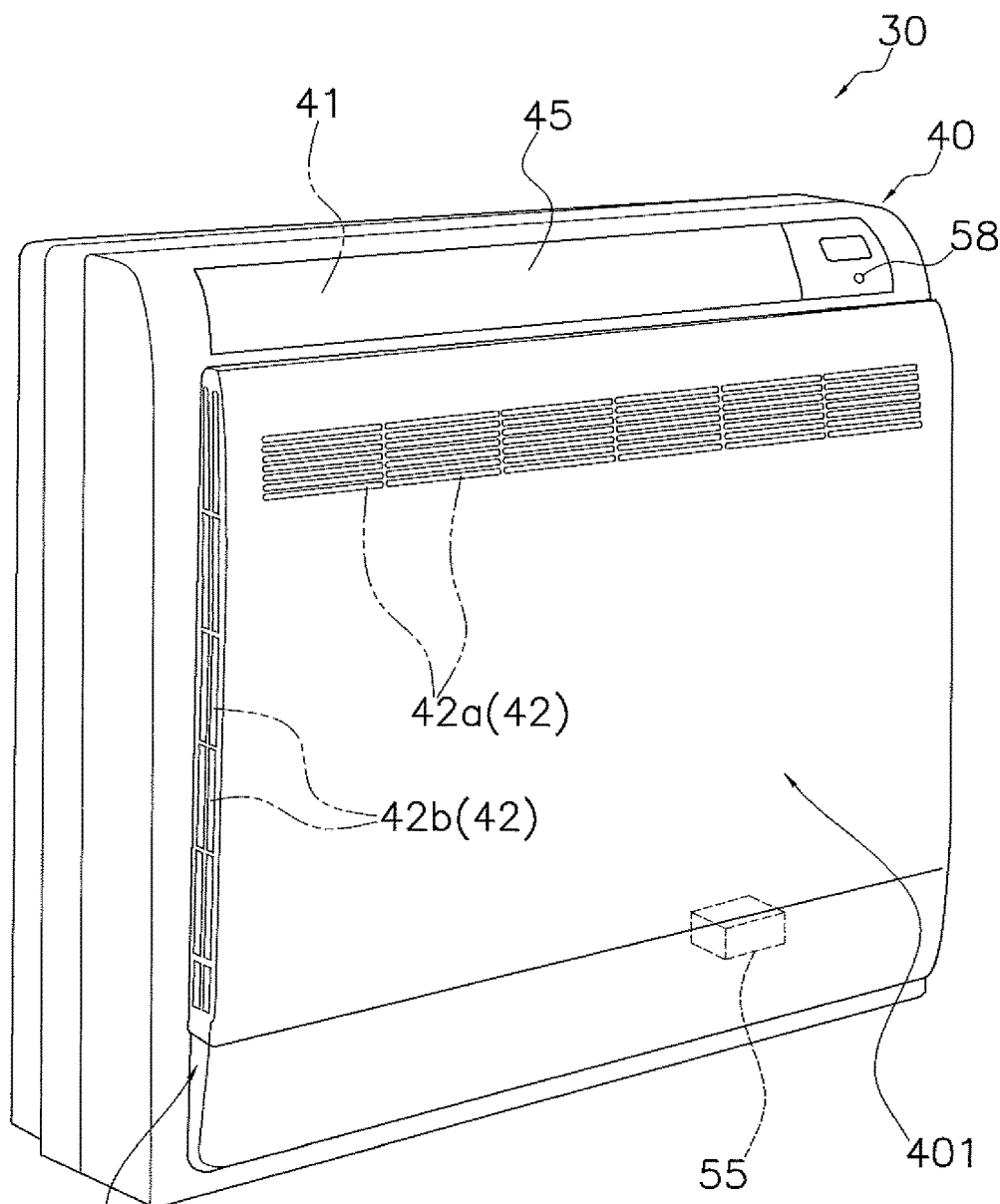
FIG. 2 is an external perspective view of an indoor unit.
Figure 2:
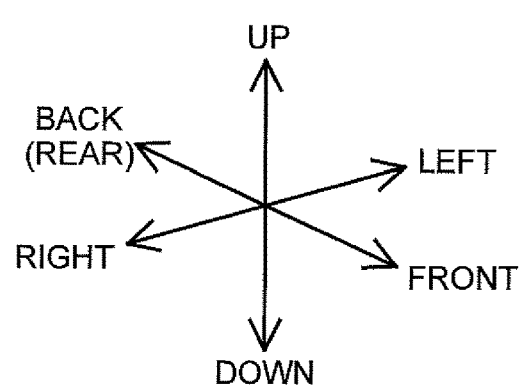
Figure 3:
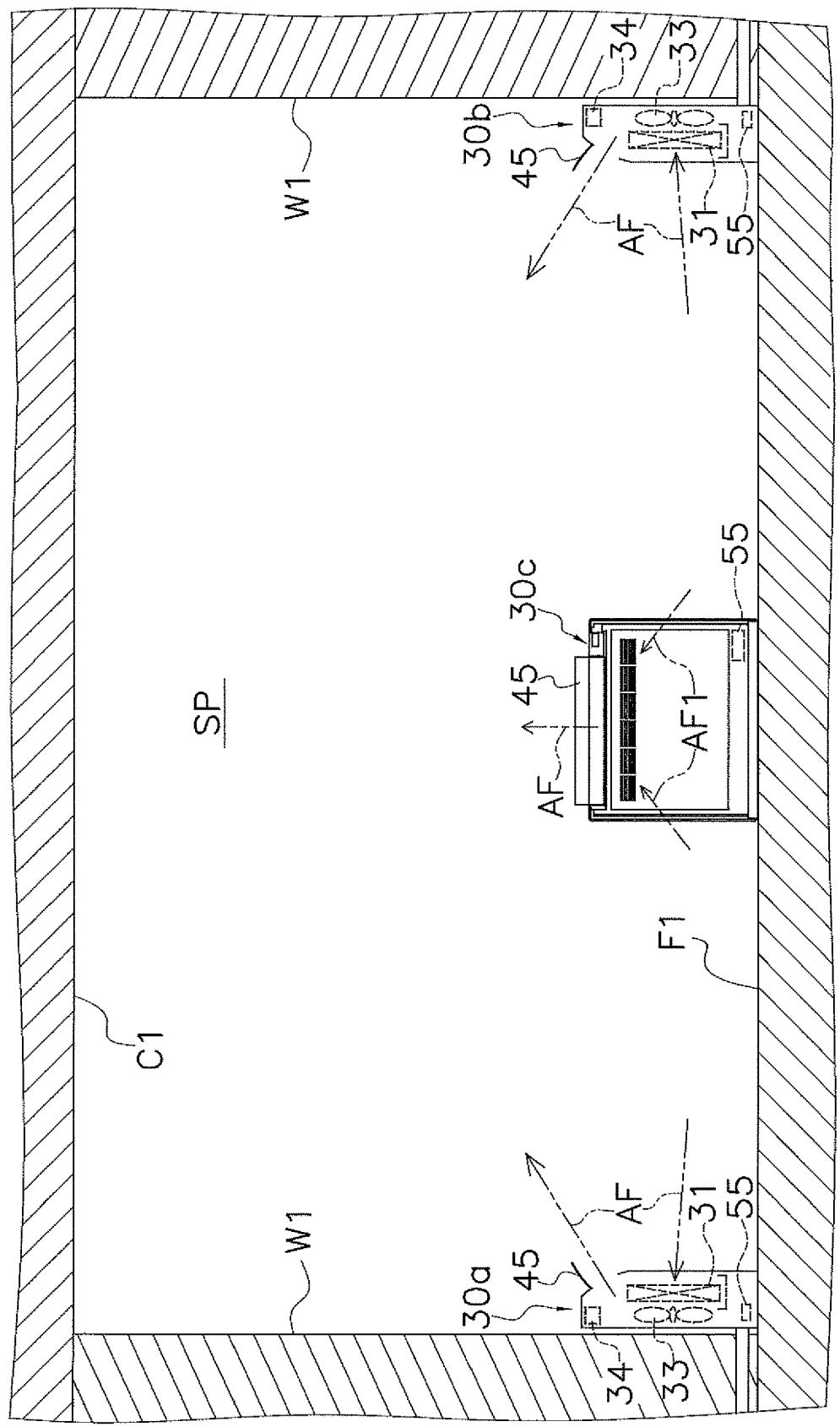
FIG. 3 is a schematic drawing showing the manner in which indoor units are arranged in a target space.

FIG. 2 is an external perspective view of the indoor unit 30. FIG. 3 is a schematic drawing showing the manner in which the indoor units 30 are arranged in the target space SP.

The indoor unit 30 has a casing 40 that has substantially cuboid-shaped outer contours. The indoor unit 30 has the indoor heat exchanger 31, the indoor fan 33, and other units that are accommodated in the casing 40.

The indoor units 30 are arranged on the floor F1 of the target space SP. Specifically, each of the indoor units 30 is arranged in a state such that bottom part of the casing 40 is adjacent to the floor F1, and back part of the casing 40 is adjacent to side wall W1. In the present embodiment, the indoor unit 30a and the indoor unit 30b are arranged so as to face each other, and the indoor unit 30c is arranged so as to be positioned between the indoor unit 30a and the indoor unit 30b.

In the casing 40 of the indoor unit 30 is formed an opening (referred to below as a "discharge port 41") that functions as a discharge port for the air flow AF generated by the indoor fan 33, and a plurality of openings (referred to below as "intake ports 42") that function as intake ports.

Specifically, the discharge port 41 is formed in a front part 401 of the casing 40, in a position higher than the center of the casing 40.

The intake ports 42 include front intake ports 42a formed in the front part 401 of the casing 40, and side intake ports 42b formed in left and right side parts 402 that join together the front part 401 and the back part of the casing 40. The plurality of front intake ports 42a and the plurality of side intake ports 42b are formed at predetermined positions in the casing 40, so as to form rows vertically and horizontally (left-to-right and front-to-back). More specifically, the front intake port 42a is of a rectangular configuration that is long in the width direction of the casing 40. The plurality of the front intake ports 42a are formed at a height position above the center of the casing 40 and below the discharge port 41. The side intake port 42b is of a rectangular configuration that is long in the vertical direction of the casing 40. The plurality of the side intake ports 42b are formed at height positions below the discharge port 41, extending from the upper parts to the lower parts of the side parts 402.

The indoor unit 30 has a flap 45 that switches between opening and closing the discharge port 41 and adjusts the discharge direction of the air flow AF from the discharge port 41, and a rotating shaft 46 for turning the flap 45.

The flap 45 configures part of the casing 40. The flap 45 is mechanically connected to the rotating shaft 46. The flap 45 turns vertically within a predetermined angular range along with the rotation of the rotating shaft 46. The actions of the flap 45 are controlled by the controller 60.

Figure 4:
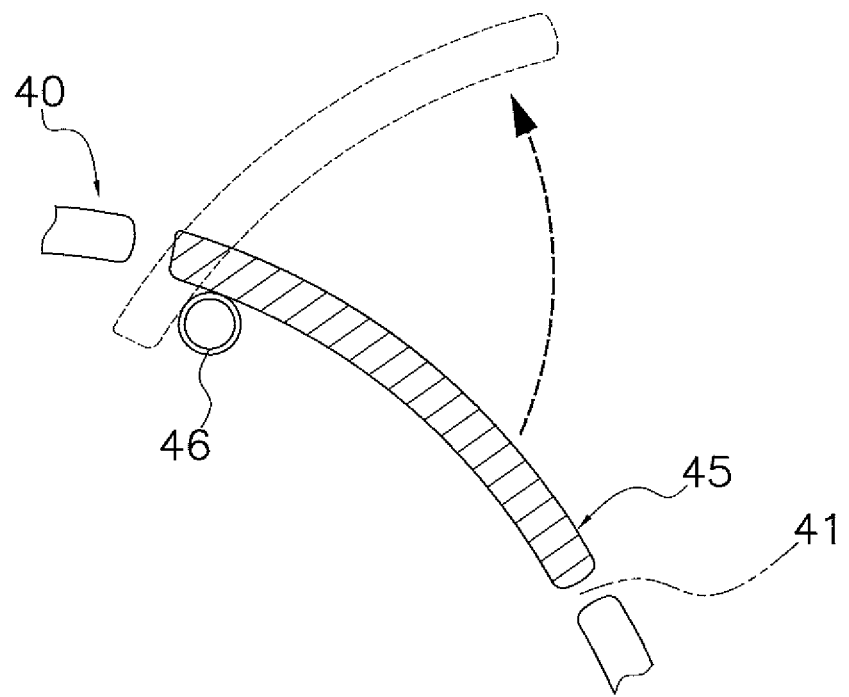
FIG. 4 is a schematic drawing showing the manner in which a discharge port opens and closes due to the turning of a flap.
Figure 4:
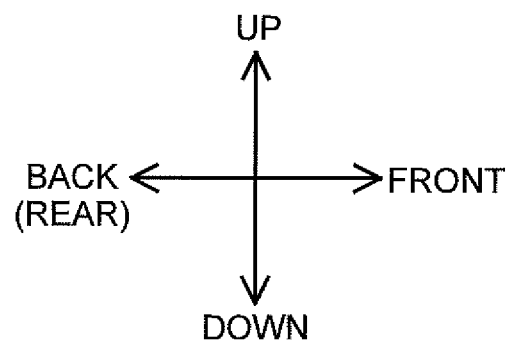
Figure 5:
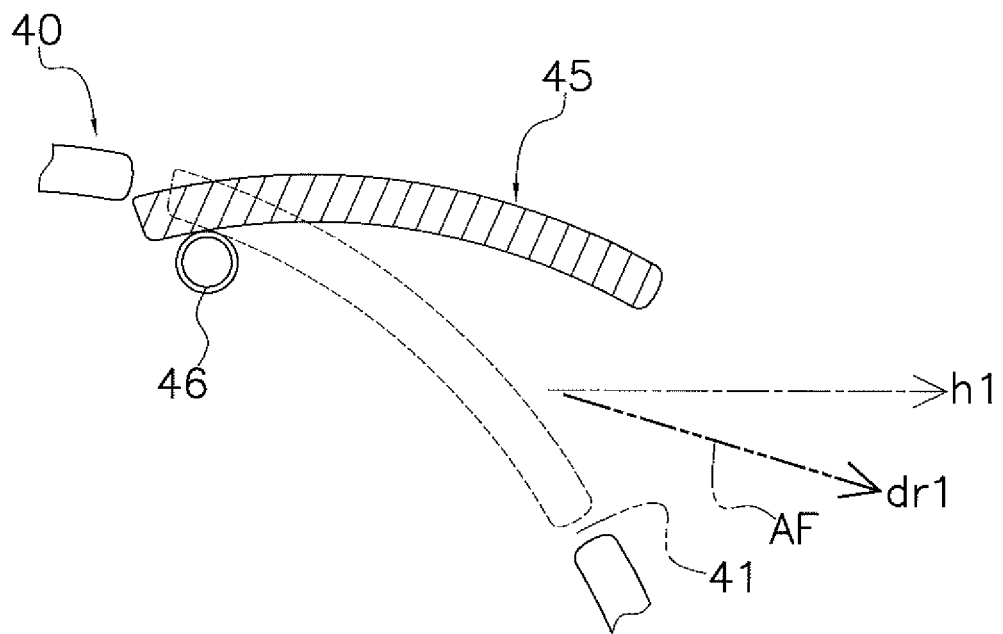
FIG. 5 is a schematic drawing showing the manner in which the flap turns and an air flow is blown out in a direction oriented lower than horizontal during operation.
Figure 5:
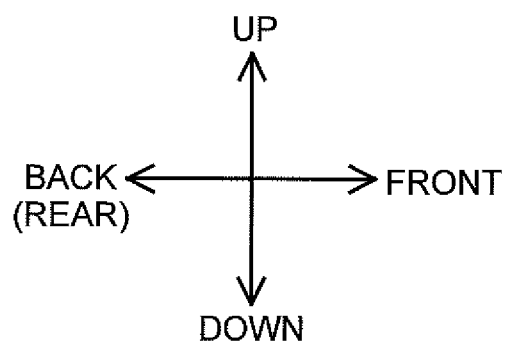
Figure 6:
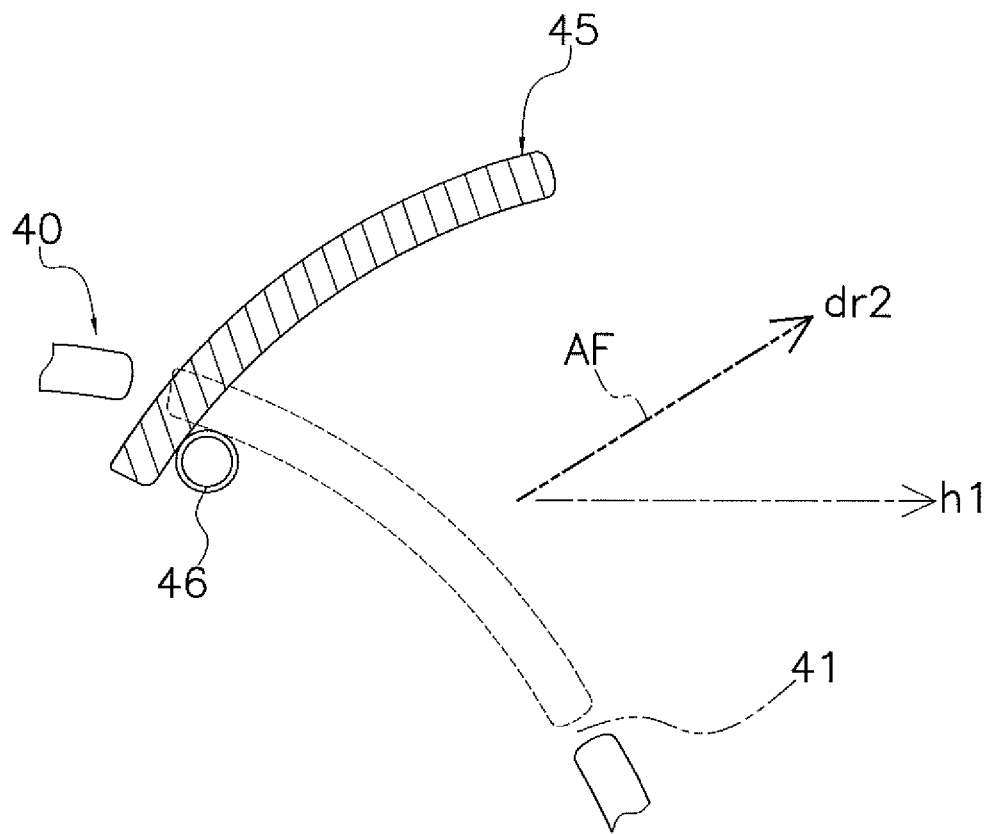
FIG. 6 is a schematic drawing showing the manner in which the flap turns and the air flow is blown out in a direction oriented higher than horizontal during operation.
Figure 6:
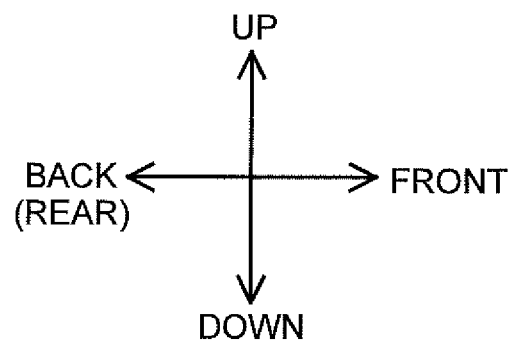

FIG. 4 is a schematic drawing showing the manner in which the discharge port 41 opens and closes due to the turning of the flap 45. FIG. 5 is a schematic drawing showing the manner in which the flap 45 turns and the air flow AF is blown out in a direction dr1 during operation. FIG. 6 is a schematic drawing showing the manner in which the flap 45 turns and the air flow AF is blown out in a direction dr2 during operation.

When the indoor unit 30 has stopped, the flap 45 is set to an angle at which the lower end part on the front side is at the lowest orientation (stopped angle), and the discharge port 41 is closed (see FIG. 4). When the indoor unit 30 is in operation, the flap 45 is turned upward, opening the discharge port 41, and the angle of the flap 45 is controlled as appropriate so that the flap 45 assumes a posture corresponding to the discharge direction of the air flow AF. Specifically, when the indoor unit 30 is in operation, the discharge direction of the air flow AF is changed upward and downward due to the flap 45 being turned vertically. In the present embodiment, when the indoor unit 30 is in operation, the flap 45 is capable of turning within a range from an angle (downward discharge angle) at which the discharge direction of the air flow AF is a direction dr1 oriented lower than the horizontal direction hl as shown in FIG. 5, to an angle (upward discharge angle) at which the discharge direction is a direction dr2 oriented higher than the horizontal direction hl as shown in FIG. 6.

The rotating shaft 46, which is mechanically connected to an output shaft of a flap-driving motor 47 (see FIG. 7), rotates in coordination with the driving of the flap-driving motor 47.

The indoor unit 30 has an opening formed in the upper part of the front part 401 of the casing 40 (more specifically, in the left side of the discharge port 41), and the refrigerant leakage notification part 58 is exposed through this opening.

The indoor unit 30 has the refrigerant leakage sensor 55 accommodated in proximity to the bottom part of the casing 40. Due to the refrigerant leakage sensor 55 thus being placed in proximity to the bottom part of the casing 40, when the refrigerant having greater specific gravity than air, such as R32, leaks within the casing 40, the refrigerant leakage is quickly sensed.

(4) Details of Controller 60

Figure 7:
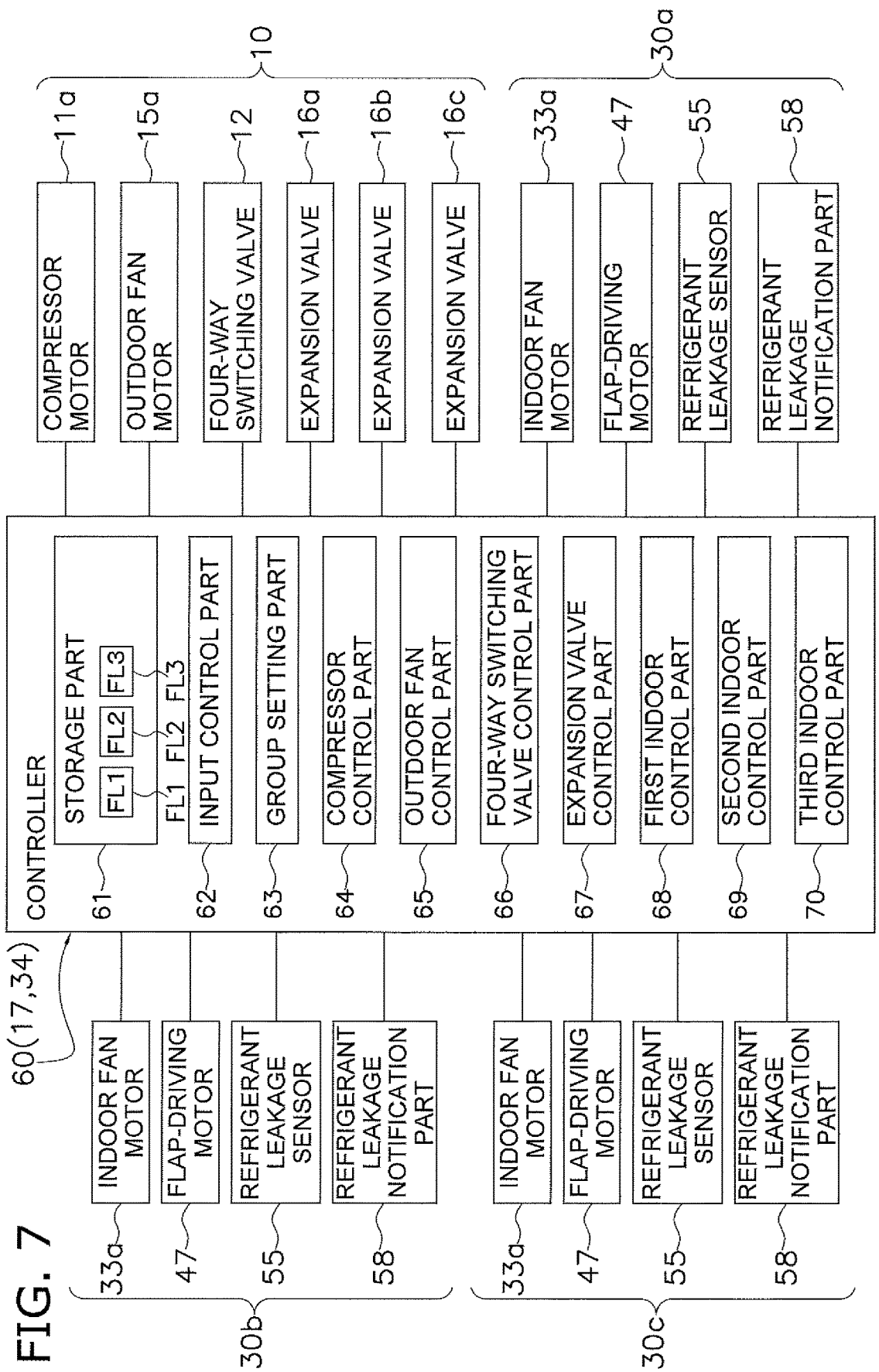
FIG. 7 is a block diagram schematically depicting the configuration of a controller and the units connected to the controller.

FIG. 7 is a block diagram schematically depicting the configuration of the controller 60 and the units connected to the controller 60.

The controller 60 is electrically connected with the compressor motor 11a, the outdoor fan motor 15a, the four-way switching valve 12 and the expansion valves 16 (16a, 16b, and 16c). Also, the controller 60 is electrically connected with the components built into the respective indoor unit 30 (30a, 30b, 30c): the indoor fan motor 33a, the flap-driving motor 47, the refrigerant leakage sensor 55, and the refrigerant leakage notification part 58. Additionally, the controller 60 is electrically connected with various sensors not illustrated (e.g. a temperature sensor for detecting temperature within the target space SP and/or the like).

The controller 60 mainly includes a storage part 61, an input control part 62, a group setting part 63, a compressor control part 64, an outdoor fan control part 65, a four-way switching valve control part 66, an expansion valve control part 67, a first indoor control part 68, a second indoor control part 69, and a third indoor control part 70.

(4-1) Storage Part 61

The storage part 61 is configured from a ROM, a RAM, a flash memory, and/or the like. The storage part 61 includes volatile and non-volatile storage areas for storing various information. Specifically, the storage part 61 stores control programs used in the processes of the parts of the controller 60, a grouping table TB1 (described hereinafter) and the like, in predetermined storage areas.

The storage part 61 includes a command discerning flag FL1 for discerning various setting items (starting/stopping of the respective indoor units 30, operation mode, set temperature, set airflow volume, airflow direction and the like) specified on the basis of commands inputted by users or managers via the remote controllers 50 or the like. The command discerning flag FL1 includes bits corresponding to the setting items.

The storage part 61 includes a refrigerant leakage discerning flag FL2 for individually discerning the detection results (i.e., the presence or absence of refrigerant leakage in the target space SP) of the refrigerant leakage sensors 55 built into the indoor units 30. The refrigerant leakage discerning flag FL2 is set the bit that corresponds to a case of a refrigerant leakage signal being received from any of the refrigerant leakage sensors 55 (i.e., a case of refrigerant leakage occurring in the target space SP).

The storage part 61 includes a situation discerning flag FL3 for discerning the detection results of the other various sensors (e.g. temperature sensors that detect the temperature in the target space SP etc.). The situation discerning flag FL3 includes bits corresponding to the number of pieces of information outputted from the various sensors.

(4-2) Input Control Part 62

The input control part 62 receives command information sent from the remote controllers 50, and sets the command discerning flag FL1 so as to correspond to the command. The input control part 62 sets a corresponding bit of the refrigerant leakage discerning flag FL2 when a refrigerant leakage signal has been received from any of the refrigerant leakage sensors 55. The input control part 62 receives signals sent from the other various sensors, and sets a corresponding bit of the situation discerning flag FL3.

(4-3) Group Setting Part 63

When group setting is performed by a user or manager via a remote controller 50 or an input device (not shown), the group setting part 63 creates a table (worded below as a "grouping table TB1") that is based on this group setting, and stores the table in predetermined storage information of the storage part 61. In this embodiment, group setting is a process of by which the indoor units 30 included in the air-conditioning system 100 are divided into groups and registered. Specifically, group setting involves selecting air-conditioning indoor units (in this embodiment, indoor units 30) that will be controlled in coordinated control in accordance with the situation.

When a new group setting is performed by a user or manager, the group setting part 63 appropriately creates or updates the grouping table TB1. With the air-conditioning system 100, it is thereby possible for the actions of the plurality of indoor units 30 to be controlled in coordinated control (group-controlled) in accordance with the situation.

FIG. 8 is a schematic diagram showing an example of the grouping table TB1 used in coordinated control (group control) of multiple indoor units 30. Generating and updating (group setting) the grouping table TB1 is done on the basis of inputting of a command to a remote controller 50 by a user or manager.

In the grouping table TB1 shown in FIG. 8, the values of various variables ("unit number," "group number," and "emergency group number") are defined for each air-conditioning indoor unit (indoor unit 30). The unit number is identification information for identifying the type of apparatus (e.g. whether the apparatus is any of an indoor air-conditioner, an air ventilator, a dehumidifier, an air purifier and the like). The group number is information that identifies the group to which the air-conditioning indoor unit belongs during normal times (when refrigerant leakage is not occurring). The emergency group number is information that identifies the group to which the air-conditioning indoor unit belongs during an emergency (when refrigerant leakage etc. is occurring).

In the grouping table TB1 shown in FIG. 8, the values of the unit numbers for the indoor units 30a, 30b, and 30c are defined as "1," which specifies that the indoor units are air-conditioning indoor units. Additionally, the value of the group number for the indoor unit 30a is defined as "1," and the values of the group numbers for the indoor units 30b and 30c are defined as "2." Specifically, during normal times, the indoor unit 30a belongs to group 1, separate from the group 2 to which the indoor units 30b and 30c belong. Additionally, the values of the emergency group numbers for the indoor units 30a, 30b, and 30c are defined as "3." Specifically, the indoor units 30a, 30b, and 30c are shown to belong to the same group 3 during an emergency.

(4-4) Compressor Control Part 64, Outdoor Fan Control Part 65, Four-Way Switching Valve Control Part 66, Expansion Valve Control Part 67

The compressor control part 64, the outdoor fan control part 65, and the four-way switching valve control part 66 follow the control program, and refer as appropriate to the flags (FL1, FL2, FL3) to control the actions of the other components in accordance with the situation.

Specifically, the compressor control part 64 refers as appropriate to the command discerning flag FL1 and the situation discerning flag FL3, and controls the starting/stopping and rotation speed of the compressor 11 (the compressor motor 11a) in accordance with the command information and the situation. Additionally, when any bit of the refrigerant leakage discerning flag FL2 is set, the compressor control part 64 stops the compressor 11 and causes the stopped state to continue (i.e., prohibits the driving of the compressor 11) until the refrigerant leakage discerning flag FL2 is canceled.

The outdoor fan control part 65 refers as appropriate to the command discerning flag FL1, and controls the starting/stopping and rotation speed of the outdoor fan 15 (the outdoor fan motor 15a) on the basis of the command information. Additionally, when any bit of the refrigerant leakage discerning flag FL2 is set, the outdoor fan control part 65 stops the outdoor fan 15 and causes this state to continue until the refrigerant leakage discerning flag FL2 is canceled.

The four-way switching valve control part 66 refers as appropriate to the command discerning flag FL1, and controls the switching of the four-way switching valve 12 on the basis of the command information. Additionally, when any bit of the refrigerant leakage discerning flag FL2 is set, the four-way switching valve control part 66 switches the four-way switching valve 12 to the air-cooling cycle state (the state shown by the solid lines of the four-way switching valve 12 in FIG. 1), and causes this state to continue until the refrigerant leakage discerning flag FL2 is canceled.

The expansion valve control part 67 refers as appropriate to the command discerning flag FL1 and the situation discerning flag FL3, and individually controls the opening degrees of the expansion valves 16 in accordance with the command information and the situation. Additionally, when any bit of the refrigerant leakage discerning flag FL2 is set, the expansion valve control part 67 sets the opening degrees of the expansion valves 16 to a minimum opening degree (fully closed state), and causes this state to continue until the refrigerant leakage discerning flag FL2 is canceled.

(4-5) First Indoor Control Part 68, Second Indoor Control Part 69, Third Indoor Control Part 70

Each of the first indoor control part 68, the second indoor control part 69, and the third indoor control part 70 is a functional part that controls the actions of the indoor fan 33 (indoor fan motor 33a), the flap 45 (flap-driving motor 47), and the refrigerant leakage notification part 58 in the corresponding indoor unit 30 (30a, 30b, or 30c). Specifically, the first indoor control part 68 corresponds to the indoor unit 30a, the second indoor control part 69 corresponds to the indoor unit 30b, and the third indoor control part 70 corresponds to the indoor unit 30c.

The first indoor control part 68, the second indoor control part 69, and the third indoor control part 70 refer as appropriate to the command discerning flag FL1, the situation discerning flag FL3, and the grouping table TB1. Each of the first indoor control part 68, the second indoor control part 69, and the third indoor control part 70 controls the starting/stopping and rotation speeds of the indoor fan 33 (indoor fan motor 33a), the opening and closing actions of the flap 45 (flap-driving motor 47), and the actions of the refrigerant leakage notification part 58 in the corresponding indoor unit 30 on the basis of the command information, in accordance with the situation.

For example, when an operation start command is inputted to the corresponding indoor unit 30 via the remote controller 50 or the like, each of the first indoor control part 68, the second indoor control part 69, and the third indoor control part 70 causes the indoor fan 33 to be driven on the basis of a set airflow volume, and causes the flap 45 to turn on the basis of a set airflow direction. The indoor unit 30 to which the operation start command has been inputted thereby goes into the operating state.

When another indoor unit 30 belonging to the same group (i.e., having the same group number) goes into the operating state, each of the first indoor control part 68, the second indoor control part 69, and the third indoor control part 70 starts up the indoor fan 33 and causes the flap 45 to turn on the basis of the set airflow direction in the corresponding indoor unit 30. When an operation start command is inputted to any indoor unit 30 of the plurality of indoor units 30 in the same group, the other indoor unit 30 also enters the operating state, and the coordinated control is carried out.

When operation stops, each of the first indoor control part 68, the second indoor control part 69, and the third indoor control part 70 sets the flap 45 of the corresponding indoor unit 30 to the stopped angle (see FIG. 4) and closes the discharge port 41. Additionally, during operation, each of the first indoor control part 68, the second indoor control part 69, and the third indoor control part 70 causes the flap 45 of the corresponding indoor unit 30 to turn on the basis of the situation discerning flag FL3 so that the air flow AF is blown out in a direction matching the airflow direction specified in the command information.

When the corresponded bit in the refrigerant leakage discerning flag FL2 is set (i.e., when a refrigerant leakage signal is sent from the refrigerant leakage sensor 55 to the corresponding indoor unit 30), each of the first indoor control part 68, the second indoor control part 69, and the third indoor control part 70 causes the indoor fan 33 to be driven at the first rotation speed, and sets the flap 45 to the upward discharge angle so that the discharge direction of the air flow AF is the direction dr2 that is higher than the horizontal direction h1.

When another bit in the refrigerant leakage discerning flag FL2 is set (i.e., when a refrigerant leakage signal is sent from the refrigerant leakage sensor 55 to the indoor unit 30 other than the corresponding indoor unit 30), each of the first indoor control part 68, the second indoor control part 69, and the third indoor control part 70 refers to the grouping table TB1. Then, When this refrigerant leakage signal is sent to the indoor unit 30 having the same emergency group number, each of the first indoor control part 68, the second indoor control part 69, and the third indoor control part 70 causes the indoor fan 33 to be driven at the second rotation speed, and sets the flap 45 at the upward discharge angle so that the discharge direction of the air flow AF is the direction dr2 that is higher than the horizontal direction hl.

Due to these actions, when a refrigerant leakage signal is sent from a refrigerant leakage sensor 55 to any indoor unit 30 of the plurality of indoor units 30, the indoor fan 33 in that indoor unit 30 is driven at the first rotation speed, and the indoor fan 33 in another indoor unit 30 having the same emergency group number as that indoor unit 30 is driven at the second rotation speed.

In the present embodiment, because the indoor units 30a, 30b, and 30c all have the same emergency group number, when a refrigerant leakage signal is sent from a refrigerant leakage sensor 55 to any indoor unit 30 (i.e., when refrigerant leakage has occurred in the target space SP), the indoor fans 33 are driven and the air flows AF are blown out higher than the horizontal direction hl in all of the indoor units 30.

In the present embodiment, the first rotation speed and the second rotation speed are both set to a maximum speed (a speed at which the airflow volume of the air flow AF reaches a maximum). Specifically, the first rotation speed and the second rotation speed are set to the same speed in the present embodiment.

When a predetermined time duration t1 elapses after the above-described process during refrigerant leakage is executed, each of the first indoor control part 68, the second indoor control part 69, and the third indoor control part 70 continuously changes (swing) the discharge direction of the air flow AF up and down by continually turning the flap 45 up and down and moving the flap 45 back and forth between the upward discharge angle and the downward discharge angle. In the present embodiment, the predetermined time duration t1 is set to three minutes. The first indoor control part 68, the second indoor control part 69, and the third indoor control part 70 are configured to be capable of counting the time duration.

Due to the first indoor control part 68, the second indoor control part 69, and the third indoor control part 70 executing the associated control, when the predetermined time duration t1 elapses after refrigerant leakage has occurred in the target space SP, the leaked refrigerant diffused upward by the indoor units 30 will be diffused evenly throughout the entire target space SP, and increases of leaked refrigerant concentration in specific sections of the target space SP are therefore suppressed.

When any bit of the refrigerant leakage discerning flag FL2 is set, each of the first indoor control part 68, the second indoor control part 69, and the third indoor control part 70 supplies a predetermined drive voltage to the refrigerant leakage notification part 58 placed in the corresponding indoor unit 30 so that the refrigerant leakage notification part 58 lights up.

In the following description, the indoor unit 30 electrically connected with the refrigerant leakage sensor 55 that has sent the refrigerant leakage signal is referred to as a "refrigerant-leaking indoor unit" for the sake of convenience in the description. Additionally, indoor units 30 defined with the same group number (i.e., indoor units 30 belonging to the same group in normal times) are collectively referred to as "group indoor units." Additionally, indoor units 30 defined with the same emergency group number (i.e., indoor units 30 belonging to the same group during an emergency) are collectively referred to as "emergency group indoor units."

(5) Process Flow for Controller 60

Figure 9:
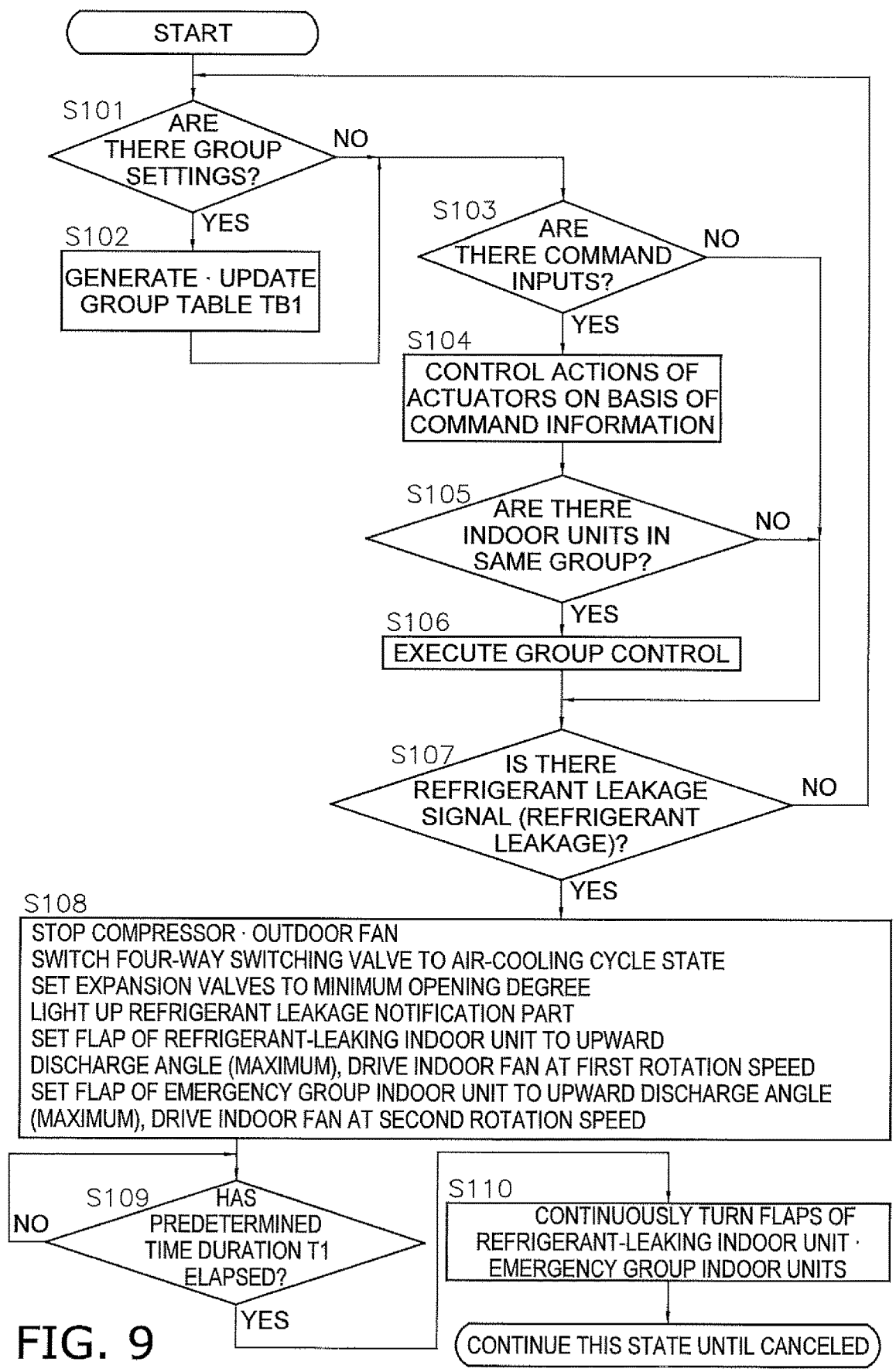
FIG. 9 is a flowchart showing an example of the process flow of the controller.

FIG. 9 is a flowchart showing an example of the process flow for the controller 60. When a power source is supplied to the controller 60, the controller 60 executes a process with, e.g., a flow such as the following. The following process flow is one example and can be altered as appropriate.

In step S101, the controller 60 determines whether or not a command relating to group setting has been inputted via a remote controller 50 or the like. When the determination is NO (i.e., when group setting has not been performed), the controller advances to step S103. When the determination is YES (i.e., when group setting has been performed), the controller advances to step S102.

In step S102, the controller 60 generates or updates a grouping table TB1 on the basis of the inputted command relating to the group setting. The process then advances to step S103.

In step S103, the controller 60 determines whether or not the command (e.g. the command switching the starting/stopping of any of the indoor units 30, the operation modes, the set temperatures, the set airflow volumes, the set airflow directions, etc.) relating to various setting items have been inputted anew by a user via a remote controller 50 or the like. When this determination is NO (i.e., when new commands have not been inputted), the controller advances to step S107. When this determination is YES (i.e., when new commands have been inputted), the controller advances to step S104.

In step S104, on the basis of the various setting items (the starting/stopping, the operation modes, the set temperatures, the set airflow volumes, the set airflow directions or the like of each indoor unit 30, etc.) specified in the command information inputted by the user, the controller 60 controls the actions of the actuators (the compressor 11, the outdoor fan 15, the four-way switching valve 12, the expansion valves 16, the indoor fans 33, and the flaps 45) of the outdoor unit 10 or the indoor unit 30 that have been instructed to start operation. The process then advances to step S105.

In step S105, on the basis of the grouping table TB1, the controller 60 determines the presence or absence of the group indoor unit related to the indoor unit 30 to which the operation start command or an operation stop command has been inputted. When there are no such group indoor units, the controller 60 advances to step S107. When there are such group indoor units, the controller 60 advances to step S106.

In step S106, the controller 60 executes group control on the group indoor units (i.e., the indoor units 30 belonging to the same group as the indoor units 30 instructed to start operating or stop operating). Specifically, the controller 60 controls the actions of the actuators of the group indoor units so that a switch is made in coordination to the operating state or an operation-stopped state. The controller advances to step S107.

In step S107, the controller 60 determines whether or not there is a refrigerant leakage signal from any of the refrigerant leakage sensors 55 (i.e., if refrigerant leakage is occurring in the target space SP). When this determination is NO (i.e., when refrigerant leakage is not occurring in the target space SP), the controller returns to step S101. When this determination is YES (i.e., when refrigerant leakage is occurring in the target space SP), the controller advances to step S108.

In step S108, the controller 60, having been informed that refrigerant is occurring, stops the compressor 11 and the outdoor fan 15 and controls the four-way switching valve 12 to the air-cooling cycle state (the state shown by the solid lines of the four-way switching valve 12 shown in FIG. 1). Additionally, the controller 60 controls the expansion valves 16 (16a, 16b, and 16c) to the minimum opening degree. Due to these actions, the refrigeration cycle (circulation of the refrigerant) stops in the refrigerant circuit RC and further refrigerant leakage is suppressed.

Additionally, the controller 60 illuminates the refrigerant leakage notification parts 58 placed in the indoor units 30. The user can thereby recognize that refrigerant leakage is occurring in the target space SP.

Additionally, the controller 60 causes the indoor fan 33 of the refrigerant-leaking indoor unit (the first indoor unit) to be driven at the first rotation speed, and sets the positioning of the flap 45 to an upward orientation that could be as high as the upper limit angle of the turnable range so that the discharge direction of the air flow AF is at the highest orientation. Additionally, in each emergency group indoor unit associated with the refrigerant-leaking indoor unit, the indoor fan 33 is driven at the second rotation speed, and the positioning of the flap 45 is set to an upward discharge angle (more specifically, the upper limit angle of the turnable range) so that the discharge direction of the air flow AF is the direction dr2, which is oriented higher than the horizontal direction hl.

Due to these actions, in the refrigerant-leaking indoor unit and the emergency group indoor unit, the air flow AF is generated and blown out into the target space SP with an upward-oriented discharge direction. Specifically, when the indoor units 30a, 30b, and 30c belong to the same emergency group, as is the case in the present embodiment, a plurality of air flows AF are generated and blown upward from each of the indoor units 30 when refrigerant leakage has occurred in the target space SP. As a result, the leaked refrigerant is dispersed by the generated plurality of air flows AF, and dispersal of leaked refrigerant is therefore facilitated (effectively carried out) in the target space SP.

Additionally, when refrigerant leakage has occurred in the target space SP, the leaked refrigerant is drawn in as the air flow AF in the indoor units 30 installed on the floor F1, after which the air flow is blown out from the discharge port 41 in the direction dr1, which is oriented higher than the horizontal direction hl. Particularly, although R32 or another leaked refrigerant having a greater specific gravity than air readily accumulates near the floor F1, in the floor-standing indoor unit 30, which are installed at a lower height position than wall-mounted or ceiling-embedded indoor unit, the leaked refrigerant is taken in from the intake ports 42 and blown out in the direction dr1, which is oriented higher than the horizontal direction hl. As a result, leaked refrigerant present near the floor F1 is dispersed upward, and accumulation near the floor F1 is suppressed.

Due to the controller 60 executing control such as is described above in step S108, even when a refrigerant having a greater specific gravity than air leaks, dispersal of the leaked refrigerant is facilitated throughout the entire target space SP, and increasing in concentration of the leaked refrigerant in specific sections are restrained.

After executing the processes in step S108, the controller 60 advances to step S109.

In step S109, the controller 60 determines whether or not the predetermined time duration t1 has elapsed after the processes of step S108 have been executed. When this determination is NO (i.e., when the predetermined time duration t1 has not elapsed), the determination is repeated in step S109. When this determination is YES (i.e., when the predetermined time duration t1 has elapsed), the controller advances to step S110.

In step S110, the controller 60 continuously turns the flaps 45, in the refrigerant-leaking indoor unit and the emergency group indoor units, up and down and causes these flaps 45 make a round trip between the upward discharge angle and the downward discharge angle. Due to such control, the discharge directions of the generated air flows AF are in a swinging state of continuously changing up and down in the indoor units 30. Due to these actions, in the target space SP, when the predetermined time duration t1 elapses after the leaked refrigerant has been detected, the leaked refrigerant blown out upward from near the floor F1 is evenly dispersed throughout the entire target space SP, and increases in the concentration of the leaked refrigerant are therefore further suppressed in specific sections of the target space SP.

The controller 60 thereafter continues this state until the state is canceled by a serviceman or the like.

(6) Characteristics (6-1)

In the air-conditioning system 100, when a refrigerant leakage sensor 55 has sensed refrigerant leakage, the controller 60 causes the indoor fan 33 to be driven at the predetermined first rotation speed in the refrigerant-leaking indoor unit, and causes the indoor fan 33 to be driven at the predetermined second rotation speed in the emergency group indoor unit associated with the refrigerant-leaking indoor unit (i.e., among indoor units 30 having the same emergency group number, the indoor unit 30 other than the refrigerant-leaking indoor unit). Security relative to refrigerant leakage is thereby ensured.

Specifically, with conventional air-conditioning indoor units, a case is envisioned in which leaked refrigerant is not properly dispersed due to the manner in which the air-conditioning indoor units are installed and/or the size of the target space SP, and security is not sufficiently guaranteed. For example, when the plurality of air-conditioning indoor units are arranged in the same target space SP, and if the indoor fan 33 of only indoor unit to which a refrigerant leakage signal has been sent from a refrigerant leakage sensor 55 is driven, there is a possibility that leaked refrigerant accumulates in the spaces near the installed positions of the other air-conditioning indoor units and the concentration in those spaces increases. In such cases, security is not guaranteed when the leaked refrigerant is refrigerant of a flammability such as, e.g., R32, as in the present embodiment.

In this case, the air-conditioning system 100 is configured so that when refrigerant leakage occurs in the target space SP, not only the indoor fan 33 of the refrigerant-leaking indoor unit but also the indoor fan 33 in the emergency group indoor unit are driven at a predetermined speed. As a result, when refrigerant leakage has occurred, the plurality of air flows AF are generated and the leaked refrigerant is dispersed by the generated plurality of air flows AF. Consequently, dispersal of the leaked refrigerant is facilitated in the target space SP, and accumulation of the leaked refrigerant in some of the target space SP is suppressed. Specifically, increases in the concentration of leaked refrigerant in specific sections of the target space SP are suppressed. Therefore, security relative to refrigerant leakage is ensured.

In the present embodiment, the indoor units 30a, 30b, and 30c can all be refrigerant-leaking indoor units. Specifically, the indoor units 30a, 30b, and 30c are all equivalent to the "first indoor unit" in the claims.

(6-2)

In the air-conditioning system 100, the refrigerant circuit RC is configured by the outdoor unit 10 and the indoor units 30 being connected via the gas interconnection pipe GP and the liquid interconnection pipes LP. Specifically, security is ensured in a "multi-type" air-conditioning system 100, in which the refrigerant circuit RC is configured by the outdoor unit 10 and the plurality of indoor units 30.

(6-3)

In the air-conditioning system 100, when a refrigerant leakage sensor 55 senses refrigerant leakage, the controller 60 drives the indoor fans 33 of the refrigerant-leaking indoor unit and the emergency group indoor units installed in the target space SP. Due to this action, when refrigerant leakage has occurred in the target space SP, the plurality of air flows AF are generated and the leaked refrigerant is dispersed by the generated plurality of air flows AF. Therefore, dispersal of the leaked refrigerant is facilitated in the target space SP, and increases in the concentration of the leaked refrigerant in specific sections of the target space SP are suppressed.

(6-4)

In the air-conditioning system 100, when a refrigerant leakage sensor 55 senses refrigerant leakage, the controller 60 causes the indoor fans 33 to be driven in all of the indoor units 30 included in the system. Due to this action, when refrigerant leakage has occurred in the target space SP, air flows AF are generated in all of the indoor units 30 and the leaked refrigerant is dispersed by the generated plurality of air flows AF. Therefore, dispersal of the leaked refrigerant is facilitated in the target space SP, and increases in the concentration of the leaked refrigerant in specific sections of the target space SP are suppressed.

(6-5)

In the air-conditioning system 100, when a refrigerant leakage sensor 55 senses refrigerant leakage, the controller 60 causes the indoor fans 33 to be driven in the indoor units 30 (emergency group indoor units) designated in the command relating to the group setting (i.e., the command designating the indoor units 30 of which the indoor fans 33 are to be driven when refrigerant leakage has occurred) inputted to the remote controller 50. The indoor units 30 of which the indoor fans 33 are driven during refrigerant leakage can thereby be selected as appropriate in accordance with the environment where the units are installed, which has exceptional versatility.

(7) Modifications

In the first embodiment described above, appropriate modifications can be made as shown in the following modifications. These modifications may be combined with other modifications so long as no contradictions arise.

(7-1) Modification 1A

In the embodiment described above, a floor-standing style is adopted in which the indoor units 30 are installed on the floor F1 of the target space SP. However, the indoor units 30 need not be floor-standing. For example, any or all of the indoor units 30a, 30b, and 30c may be wall-mounted, where the unit is fixed to a side wall W1 of the target space SP; ceiling-embedded or ceiling-suspended, where the unit is fixed to a ceiling C1; "side-wall-embedded," where the unit is installed in the side wall W1; floor-embedded, where the unit is installed beneath the floor F1; etc.

(7-2) Modification 1B

In the embodiment described above, the air-conditioning system 100 had three indoor units 30 (30a, 30b, and 30c). However, the number of indoor units 30 of the air-conditioning system 100 is not limited to three, and may be two, four, or more. Specifically, the number of indoor units 30 installed in the target space SP is not limited to three, and may be two, four, or more.

(7-3) Modification 1C

Additionally, in the embodiment described above, a plurality (three) of expansion valves 16 are placed in the outdoor unit 10 in the refrigerant circuit RC. However, the plurality of expansion valves 16 need not be placed in the refrigerant circuit RC. For example, the refrigerant circuit RC may be altered so that only one expansion valve 16 is placed corresponding to the plurality of indoor units 30. In such cases, in the refrigerant circuit RC, each of the indoor units 30 would preferably be connected with the outdoor unit 10 (the expansion valve 16) by a shared liquid interconnection pipe LP.

Additionally, in the embodiment described above, the expansion valves 16 are placed in the outdoor unit 10 in the refrigerant circuit RC. However, the expansion valves 16 may be placed in the indoor units 30 instead of being placed in the outdoor unit 10. In such cases, the expansion valves 16 would preferably be placed on refrigerant pipes connecting the liquid sides of the indoor heat exchangers 31 and the liquid interconnection pipes LP. Additionally, the opening degrees of the expansion valves 16 would preferably be controlled in accordance with the situation by the first indoor control part 68, the second indoor control part 69, or the third indoor control part 70.

(7-4) Modification 1D

In the embodiment described above, the indoor unit 30 is formed the front intake ports 42a formed in the front part 401 of the casings 40, and the side intake ports 42b formed in the left and right side parts 402 joining the front part 401 and back part of the casings 40, are formed as intake ports 42 for the air flows AF. However, the indoor units 30 need not have the intake ports 42 formed in such an arrangement. For example, the indoor units 30 may have only the front intake ports 42a or only the side intake ports 42b formed as intake ports 42. Additionally, the indoor unit 30 may have other intake ports 42 formed in the back part or bottom part of the casing 40, instead of/in addition to the front intake ports 42a and/or the side intake ports 42b.

(7-5) Modification 1E

In the embodiment described above, the refrigerant leakage sensor 55 is placed inside the casing 40 of the indoor unit 30. However, the refrigerant leakage sensor 55 need not be placed inside the casing 40, and may be placed in other locations as long as the sensor is able to sense refrigerant leakage in the target space SP. For example, the refrigerant leakage sensor 55 may be placed in the remote controller 50 or in other devices installed in the target space SP. Additionally, the refrigerant leakage sensor 55 may be placed independently in the target space SP.

Additionally, in the embodiment described above, the refrigerant leakage sensor 55 is built into each of the indoor units 30. Specifically, the plurality of refrigerant leakage sensors 55 are installed in the target space SP. However, the number of refrigerant leakage sensors 55 installed in the target space SP need not be a plural number.

(7-6) Modification 1F

In the embodiment described above, the refrigerant leakage sensor 55 is electrically connected with the indoor unit control part 34, and the refrigerant leakage sensor 55 is designed to send the refrigerant leakage signal to the indoor unit control part 34 upon detecting refrigerant leakage. However, instead of being connected to the indoor unit control part 34, the refrigerant leakage sensor 55 may be connected to other device (e.g., the outdoor unit control part 17, the remote controller 50, etc.), and may be configured so as to send the refrigerant leakage signal to the other device. The configuration is then preferably designed so that the refrigerant leakage signal is forwarded from the device that have received the refrigerant leakage signal to the indoor unit control part 34 placed nearest to the refrigerant leakage sensor 55.

(7-7) Modification 1G

In the embodiment described above, the indoor unit control part 34 and the remote controllers 50 send and receive signals by wireless communication. However, the indoor unit control part 34 and the remote controllers 50 may be connected by communication lines, and may be configured so that the sending and receiving of signals between the two is carried out by wired communication.

Additionally, in the embodiment described above, the outdoor unit control part 17 and the indoor unit control part 34 are connected by the communication line cb1, and signals are sent and received therebetween by wired communication. However, the outdoor unit control part 17 and the indoor unit control part 34 may be configured so as to send and receive signals by wireless communication using infrared rays, radio waves, and/or the like.

(7-8) Modification 1H

In the embodiment described above, the controller 60 is configured by being connected the outdoor unit control part 17 and the indoor unit control parts 34 via the communication line cb1. However, the controller 60 need not be configured in such a manner. For example, the controller 60 may be configured by the outdoor unit control part 17 and/or the indoor unit control parts 34, and the remote controllers 50, a central management controller and/or another device, which are arranged in such a manner so as to be able to communicate with each other.

Additionally, the elements (61, 62, . . . 70) configuring the controller 60 need not be placed inside the outdoor unit control part 17 or the indoor unit control part 34, and may be placed in other locations as long as the elements are able to communicate via a communication network.

(7-9) Modification 1I

In the embodiment described above, the refrigerant leakage notification part 58 is light-emitting part, e.g., LED light or the like, that is illuminated due to being supplied with a predetermined voltage. However, the refrigerant leakage notification part 58 can be altered as appropriate as long as the parts is output part capable of notifying that refrigerant leakage has occurred. For example, the refrigerant leakage notification part 58 may be speaker capable of outputting sound due to being supplied with a predetermined voltage.

Additionally, the refrigerant leakage notification part 58 is placed in the upper part on the front side of the casing 40. However, the refrigerant leakage notification part 58 may be installed in other positions as long as the part can be recognized by a user or manager. For example, the refrigerant leakage notification part 58 may be placed in the remote controller 50 or other devices, or placed independently.

(7-10) Modification 1J

In the embodiment described above, the controller 60, upon refrigerant leakage detection, stopped the compressor 11 and the outdoor fan 15 in order to stop the refrigeration cycle (refrigerant circulation) in the refrigerant circuit RC and controlled the four-way switching valve 12 to the air-cooling cycle state (the state shown by the solid lines of the four-way switching valve 12 shown in FIG. 1). Additionally, the controller 60 controlled the expansion valves 16 to the minimum opening degree.

However, the controller 60 need not execute these controls, and any or all of these controls may be omitted as appropriate.

(7-11) Modification 1K

Upon elapsing of the predetermined time duration t1 after the detection of refrigerant leakage, the controller 60 continually changed (swung) the discharge direction of the air flow AF up and down by continuously turning the flap 45 of a predetermined indoor unit 30 up and down and moving the flap 45 back and forth between the upward discharge angle and the downward discharge angle. In such control the predetermined time duration t1 is set to three minutes, but the predetermined time duration t1 is not necessarily limited to this time and can be altered as appropriate. For example, the predetermined time duration t1 may be set to one minute, or may be set to ten minutes.

Additionally, the controller 60 need not execute such control, and this control may be omitted as appropriate.

(7-12) Modification 1L

In the embodiment described above, when refrigerant leakage occurred, the indoor fan 33 is driven at the first rotation speed in the refrigerant-leaking indoor unit, and the indoor fans 33 are driven at the second rotation speed in the emergency group indoor units associated with the refrigerant-leaking indoor unit. The first rotation speed and the second rotation speed are both set to the maximum speed (the speed at which the air flow AF reaches a maximum airflow volume). For the purpose of increasing the effect of dispersing leaked refrigerant, the first rotation speed and the second rotation speed are preferably both set to the maximum speed.

However, the first rotation speed and the second rotation speed need not be set to the maximum speed, and can be altered as appropriate in accordance with the environment where the system is installed. Additionally, the first rotation speed and the second rotation speed need not be set to the same speed, and may be set to different speeds in accordance with the environment where the system is installed. Additionally, the first rotation speed and the second rotation speed may be defined as appropriate by a user or manager, using the grouping table TB1 or the like.

(7-13) Modification 1M

In the embodiment described above, the indoor units 30 (30a, 30b, 30c) installed in the target space SP are defined with the same emergency group number, and are set so that the indoor fans 33 are driven in all of the indoor units 30 installed in the target space SP when refrigerant leakage occurred. For the purpose of increasing the effect of dispersing leaked refrigerant, the indoor fans 33 are preferably driven in all of the indoor units 30 installed in the target space SP.

However, all of the indoor units 30 installed in the target space SP need not be defined with the same emergency group number. Specifically, when refrigerant leakage has occurred, there is no need for the indoor fans 33 to be driven in all of the indoor units 30 installed in the target space SP. For example, in the embodiment described above, a different emergency group number may be defined for the indoor unit 30c.

Even in such scenarios, in a case in which one of the indoor unit 30a and the indoor unit 30b is the refrigerant-leaking indoor unit, the other would be an emergency group indoor unit and the plurality of air flows AF would be generated. Consequently, leaked refrigerant dispersal would be facilitated and the effects of the present invention would be achieved.

(7-14) Modification 1N

Figure 10:
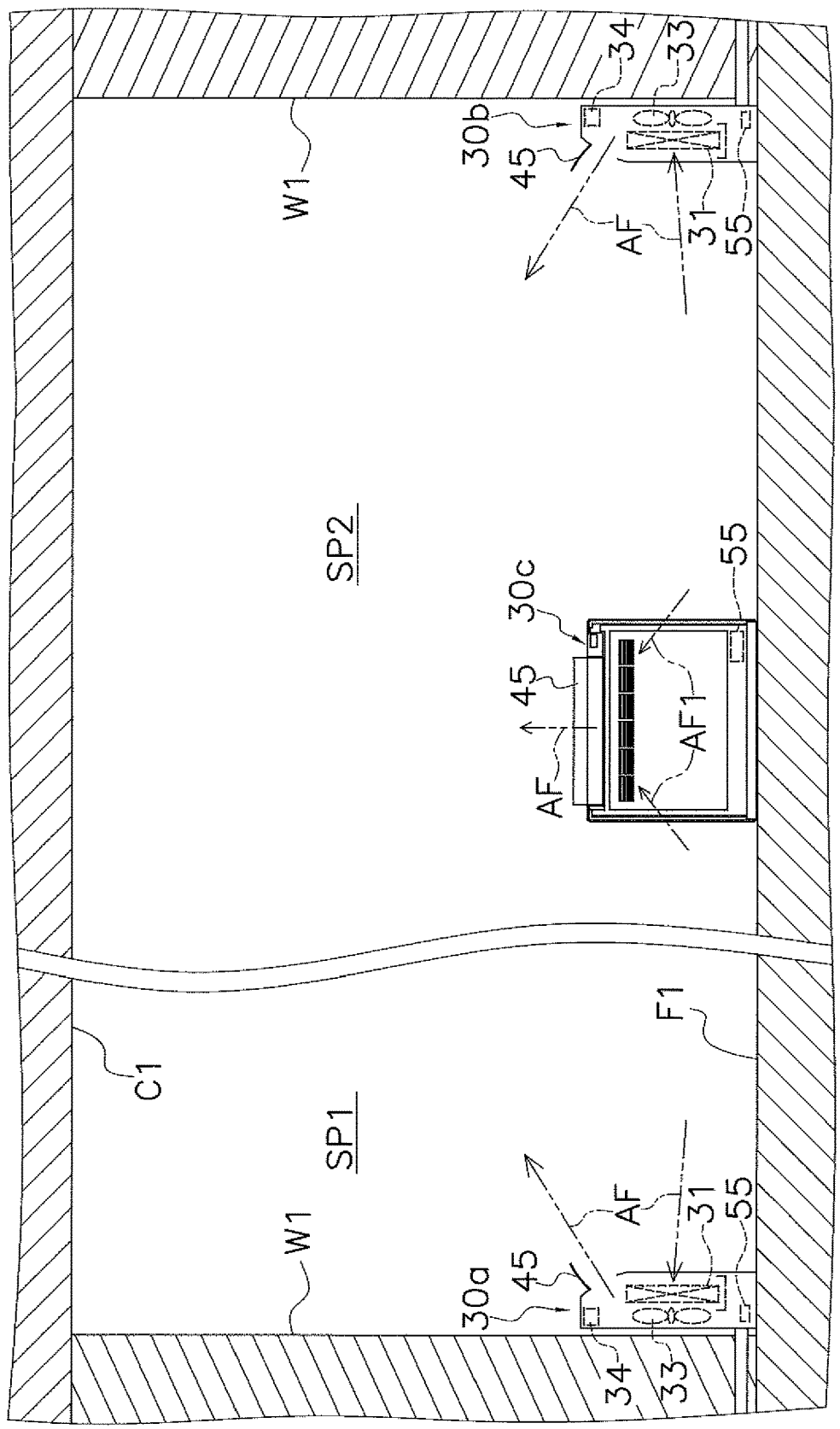
FIG. 10 is a schematic drawing showing the manner in which indoor units are arranged according to Modification 1N.

In the embodiment described above, the indoor units 30 are placed in the same target space SP. However, the indoor units 30 need not be placed in the same target space SP, and may be placed in different target spaces SP, as shown in, e.g., FIG. 10. In FIG. 10, the indoor unit 30a is placed in a target space SP1, and the indoor units 30b and 30c are placed in a target space SP2.

Even when the plurality of indoor units 30 are thus placed in different target spaces SP, security relative to refrigerant leakage can be increased.

In other words, for example, when the grouping table TB1 is created in a manner such as is shown in FIG. 8 (i.e., when all of the indoor units 30 are defined with the same emergency group number), and any of the indoor units 30a, 30b, and 30c corresponds to the refrigerant-leaking indoor unit (i.e., refrigerant leakage has occurred in either target space SP1 or SP2), the indoor fans 33 are driven in all of the indoor units 30, and air flows AF are generated in both target spaces SP1 and SP2. As a result, even when leaked refrigerant flows from one space where refrigerant leakage has occurred between the target spaces SP1 and SP2 into the other space, leaked refrigerant dispersal is facilitated and increases in the concentration of leaked refrigerant are suppressed in both spaces. Security relative to refrigerant leakage is thereby improved.

Second Embodiment

Below is a description of an air-conditioning system 100a according to a second embodiment of the present invention. Descriptions of portions common to those of the first embodiment are omitted. In the second embodiment below, alterations can be made as appropriate as long as such alterations do not deviate from the scope of the present invention, and the matters and modifications described in the first embodiment may be combined and applied as long as no contradictions arise.

Figure 11:
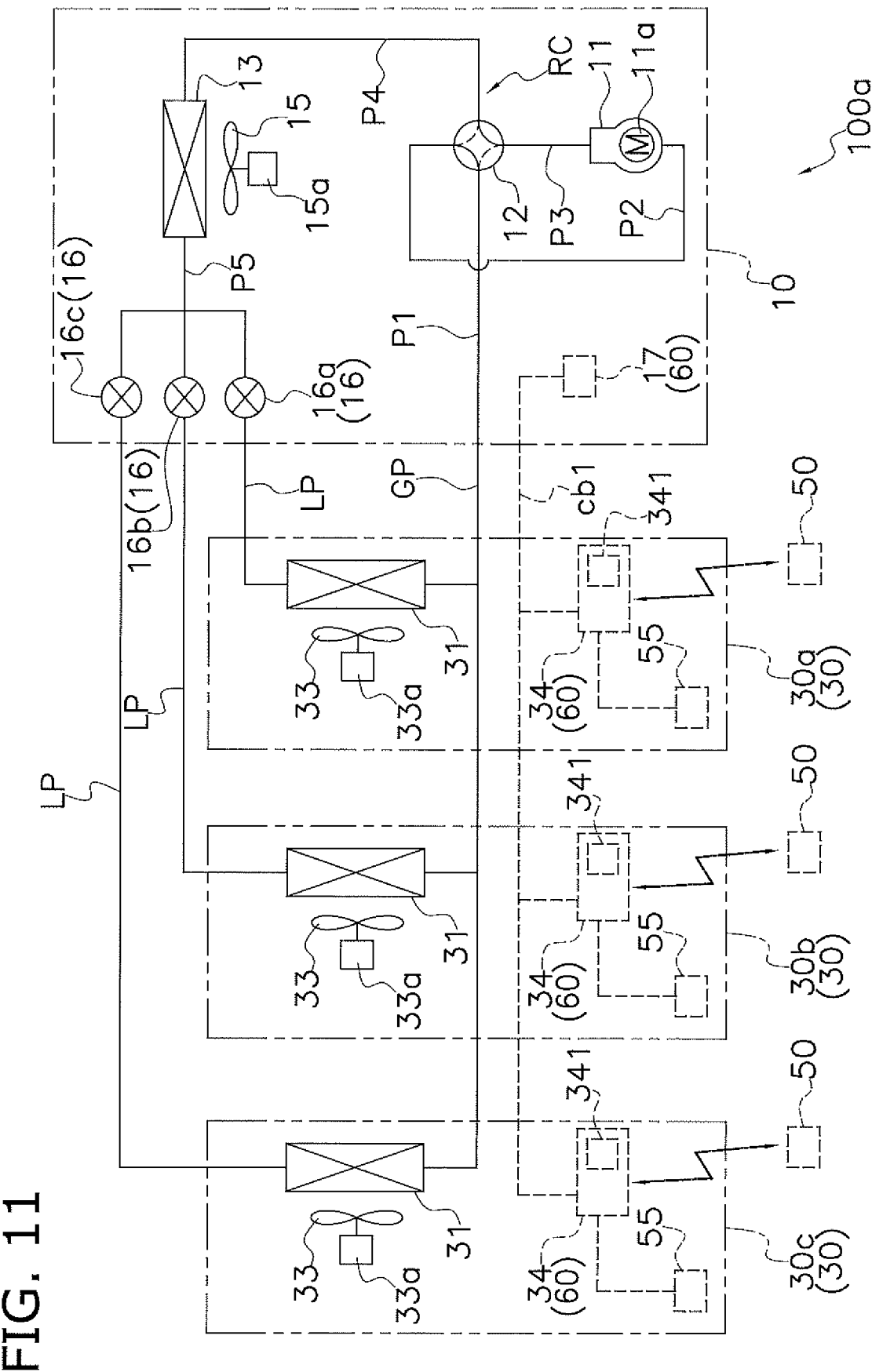
FIG. 11 is an overall configuration diagram of an air-conditioning system according to a second embodiment of the present invention.
Figure 12:
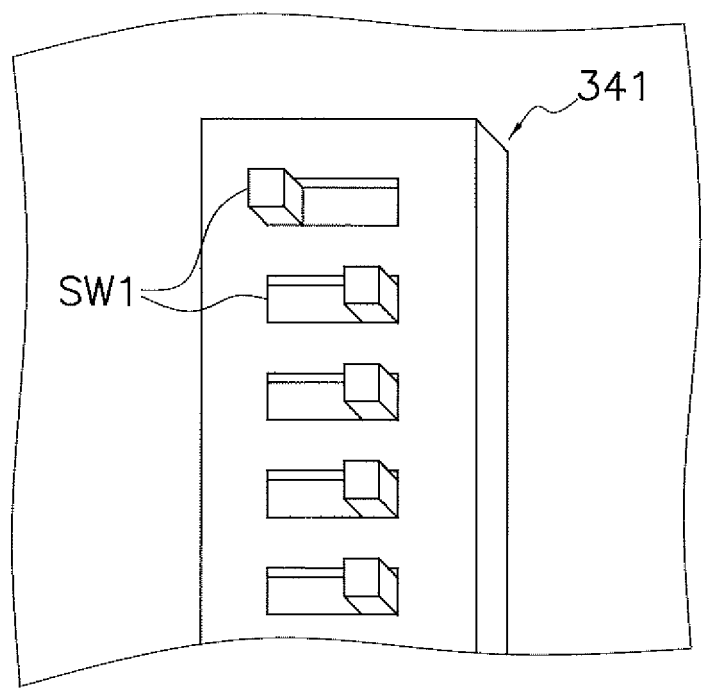
FIG. 12 is a schematic drawing showing switches of a switching part.

FIG. 11 is an overall configuration diagram of the air-conditioning system 100a. In the air-conditioning system 100a, a switching part 341 is placed in the indoor unit control part 34 of each indoor unit 30. The switching part 341 is a unit for selecting another indoor unit 30 that will drive an indoor fan 33 when a refrigerant leakage signal has been received (i.e., when refrigerant leakage has occurred). Each of the switching parts 341 has a plurality of switches SW1 such as those shown in FIG. 12.

The switches SW1 are mechanically switched between a Low state (shutoff state) and a High state (conducting state). The switches SW1 correspond one-to-one with respective indoor units 30.

Due to the switches SW1 being switched to the High state, the switching parts 341 select another indoor unit 30 that will be notified that refrigerant leakage has occurred when a refrigerant leakage signal is received.

In the air-conditioning system 100a, when refrigerant leakage has occurred, the controller 60 executes control so that the indoor fan 33 is driven at the first rotation speed in the refrigerant-leaking indoor unit (i.e., the indoor unit 30 that has received the refrigerant leakage signal), and the indoor fan 33 is driven at the second rotation speed in the indoor unit 30 that has been notified by the refrigerant-leaking indoor unit of the refrigerant leakage. Specifically, in the air-conditioning system 100a, the switches SW1 are mechanically switched by a user or the like in the switching part 341, whereby the indoor unit 30 that will be controlled in coordinated control (i.e., the indoor fan 33 will be driven) when refrigerant leakage occurs is selected. In other words, the indoor unit 30 that is group-controlled during an emergency (during refrigerant leakage) are selected by a user or the like via the switching part 341. The indoor units 30 of which the indoor fans 33 are driven during refrigerant leakage can thereby be chosen as appropriate in accordance with the environment where the system is installed.

In the air-conditioning system 100a, the group setting part 63 that creates the grouping table TB1 can be omitted as appropriate.

Additionally, in the switching part 341, jumper pins may be placed instead of the switches SW1, and these jumper pins may be configured so as to switch between a Low state (shutoff state) and a High state (conducting state).

Third Embodiment

Below is a description of an air-conditioning system 100b according to a third embodiment of the present invention. Descriptions of portions common to those of the first embodiment are omitted. In the third embodiment below, alterations can be made as appropriate as long as such alterations do not deviate from the scope of the present invention, and the matters and modifications described in the first and second embodiments may be combined and applied as long as no contradictions arise.

Figure 13:
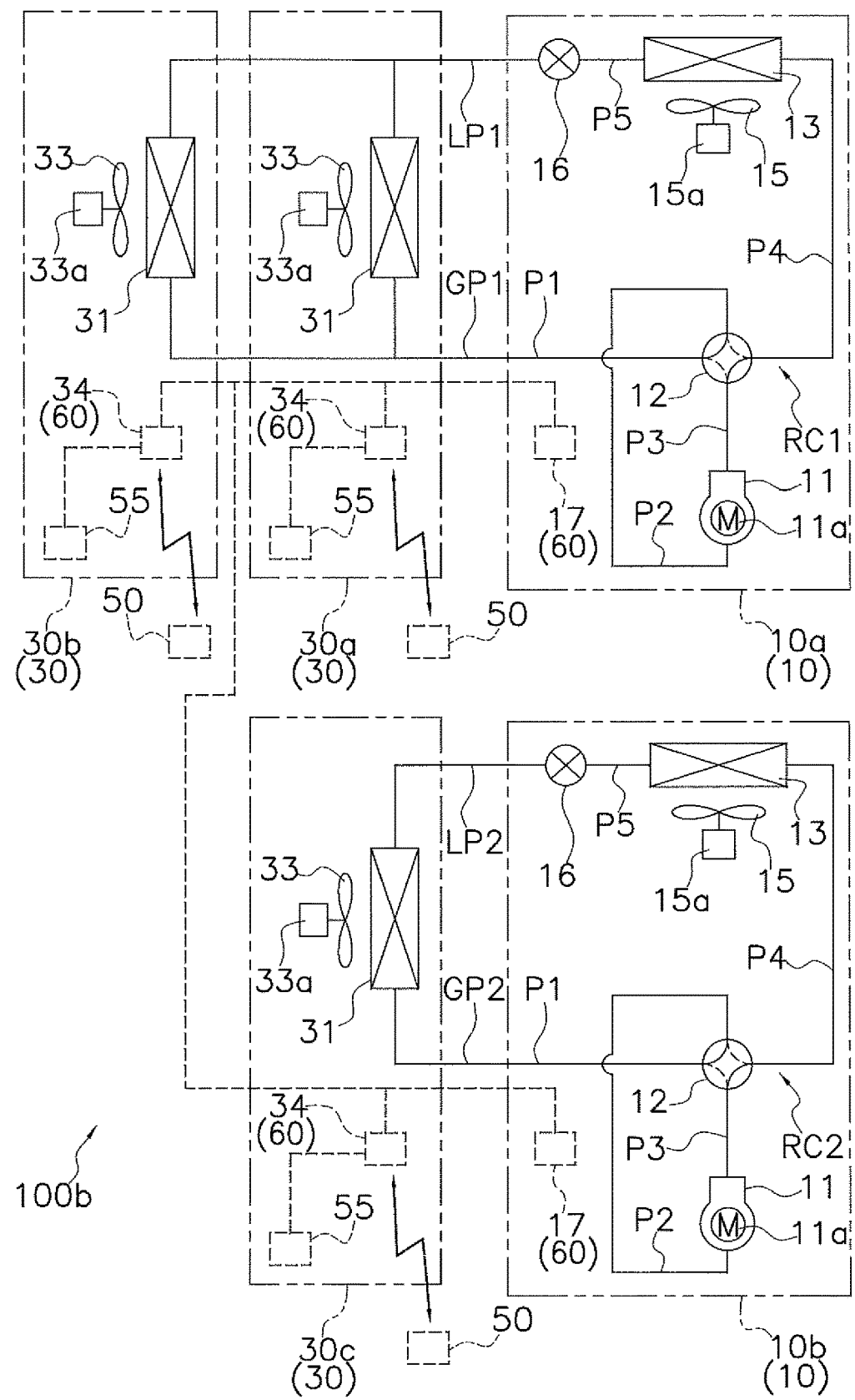
FIG. 13 is an overall configuration diagram of an air-conditioning system according to a third embodiment of the present invention.

FIG. 13 is an overall configuration diagram of the air-conditioning system 100b. The air-conditioning system 100b has a plurality of outdoor units 10 (10a, 10b). A plurality of refrigerant circuits RC (RC1, RC2) are configured in the air-conditioning system 100b.

Specifically, a refrigerant circuit RC1 is configured by an outdoor unit 10a and indoor units 30a and 30b being connected via gas interconnection pipe GP1 and a liquid interconnection pipe LP1. Additionally, a refrigerant circuit RC2 is configured by an outdoor unit 10b and the indoor unit 30c being connected via a gas interconnection pipe GP2 and a liquid interconnection pipe LP2. Specifically, in the air-conditioning system 100b, the indoor units 30a and 30b and the indoor unit 30c are connected to different refrigerant systems.

Even when a plurality of refrigerant systems are configured, as is the case with the air-conditioning system 100b, in the emergency group indoor units associated with the refrigerant-leaking indoor unit (i.e., the indoor units 30 defined with the same emergency group number as the refrigerant-leaking indoor unit in the grouping table TB1), the indoor fans 33 are driven in coordination with the refrigerant-leaking indoor unit when refrigerant leakage has occurred, regardless of whether or not the refrigerant systems are shared with the refrigerant-leaking indoor unit.

Specifically, even in the air-conditioning system 100b, which has the plurality of refrigerant systems, when refrigerant leakage has occurred in the target spaces SP, the plurality of air flows AF are generated, and leaked refrigerant dispersal is facilitated by the generated plurality of air flows AF. Consequently, increases in leaked refrigerant concentration in specific sections of the target spaces SP are suppressed, and security relating to refrigerant leakage is ensured.

In this embodiment, in the air-conditioning system 100b, any of the indoor units 30a, 30b, and 30c could be the refrigerant-leaking indoor unit. Specifically, any of the indoor units 30a, 30b, and 30c is equivalent to the "first indoor unit" in the claims. One of the outdoor units 10a and 10b is equivalent to either one of the "first outdoor unit" and the "second outdoor unit" in the claims. Additionally, either the gas interconnection pipe GP1 and the liquid interconnection pipe LP1, or the gas interconnection pipe GP2 and the liquid interconnection pipe LP2, are equivalent to either one of the "first refrigerant interconnection pipes" and the "second refrigerant interconnection pipes" in the claims. Additionally, one of the refrigerant circuits RC1 and RC2 is equivalent to either one of the "first refrigerant circuit" and the "second refrigerant circuit" in the claims.

In the refrigerant circuit RC1 or RC2, other indoor unit 30 may also be connected. Additionally, in the refrigerant circuit RC1, one of the indoor units 30a and 30b may be omitted.

Fourth Embodiment

Below is a description of an air-conditioning system 100c according to a fourth embodiment of the present invention. Descriptions of portions common to those of the first embodiment are omitted. In the fourth embodiment below, alterations can be made as appropriate as long as such alterations do not deviate from the scope of the present invention, and the matters and modifications described in the first, second, and third embodiments may be combined and applied as long as no contradictions arise.

(1) Air-Conditioning System 100c

Figure 14:
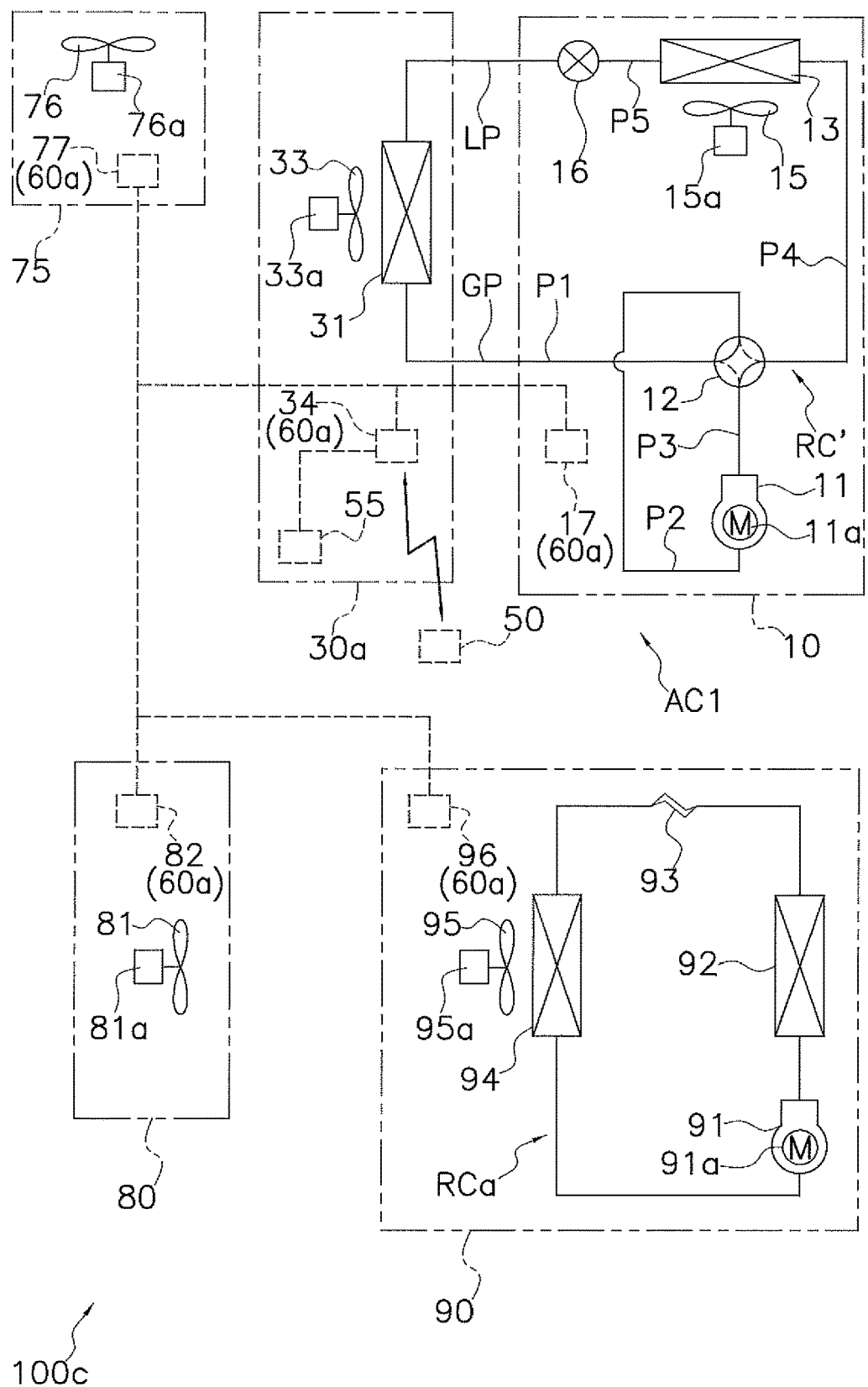
FIG. 14 is an overall configuration diagram of an air-conditioning system according to a fourth embodiment of the present invention.

FIG. 14 is an overall configuration diagram of the air-conditioning system 100c. The air-conditioning system 100c has an air-conditioning unit AC1, a ventilator 75, an air purifier 80, and a dehumidifier 90. Additionally, the air-conditioning system 100c has a controller 60a to control the actions of the other components (AC1, 75, 80, 90).

(1-1) Air-Conditioning Unit AC1

The air-conditioning unit AC1 is configured approximately the same as the air-conditioning system 100. However, in the air-conditioning unit AC1, the indoor units 30b and 30c are omitted, and a refrigerant circuit RC' is configured by the outdoor unit 10 and the indoor unit 30a. Additionally, in the air-conditioning unit AC1, the outdoor unit control part 17 and the indoor unit control part 34 are connected through communication lines with (described hereinafter) a ventilator control part 77, an air purifier control part 82, and a dehumidifier control part 96, and are configured so as to send and receive signals to and from the control parts.

(1-2) Ventilator 75

The ventilator 75, which is installed in a target space SP, is a device that achieves ventilation (air conditioning) in the target space SP by air supply or exhaust. Specifically, the ventilator 75 is equivalent to an "air-conditioning indoor unit" installed in the target space SP. The ventilator 75 is embedded and installed in the ceiling C1, side wall W1, floor F1, etc. of the target space SP, and is connected to a duct or the like communicated with an external space. The ventilator 75 has a ventilation fan 76 that generates an air flow (ventilating air flow) for air supply or exhaust, a ventilation fan motor 76a that drives the ventilation fan 76, and the ventilator control part 77, which controls the starting/stopping and rotation speed (airflow volume) of the ventilation fan 76 (the ventilation fan motor 76a).

(1-3) Air Purifier 80

The air purifier 80, which is installed in the target space SP, achieves air purification (air conditioning) in the target space SP by taking in air and removing and discharging dust. Specifically, the air purifier 80 is equivalent to an "air-conditioning indoor unit" installed in the target space SP. The air purifier 80 is a floor-standing device installed on, e.g., the floor F1 or the like. The air purifier 80 has a dust-collecting filter (not shown), an air purifier fan 81 that generates an air flow for air purification (an air-purifying air flow), an air purifier fan motor 81a that drives the air purifier fan 81, and the air purifier control part 82 which controls the starting/stopping and rotation speed (airflow volume) of the air purifier fan 81 (the air purifier fan motor 81a).

(1-4) Dehumidifier 90

The dehumidifier 90, which is installed in the target space SP, achieves dehumidification (air conditioning) of the target space SP by taking in, dehumidifying, and discharging air. Specifically, the dehumidifier 90 is equivalent to an "air-conditioning indoor unit" installed in the target space SP. The dehumidifier 90 is, e.g., a floor-standing device installed on the floor F1 or the like. A refrigerant circuit RCa is configured in the dehumidifier 90.

The dehumidifier 90 mainly has, as configurative elements of the refrigerant circuit RCa, a dehumidifier compressor 91, a refrigerant condenser 92, a capillary tube 93 serving as refrigerant decompression means, and a refrigerant evaporator 94. Additionally, the dehumidifier 90 has a dehumidifier fan 95, a dehumidifier fan motor 95a that drives the dehumidifier fan 95, and a dehumidifier control part 96.

The dehumidifier fan 95 is an air blower that generates an air flow (dehumidifying air flow) that flows in from the target space SP, passes through the evaporator 94 and the condenser 92, and then flows out to the target space SP. The dehumidifier control part 96 controls the starting/stopping and rotation speed (airflow volume) of the dehumidifier compressor 91 (a dehumidifier compressor motor 91a) and the dehumidifier fan 95 (the dehumidifier fan motor 95a).

(1-5) Controller 60a

Figure 15:
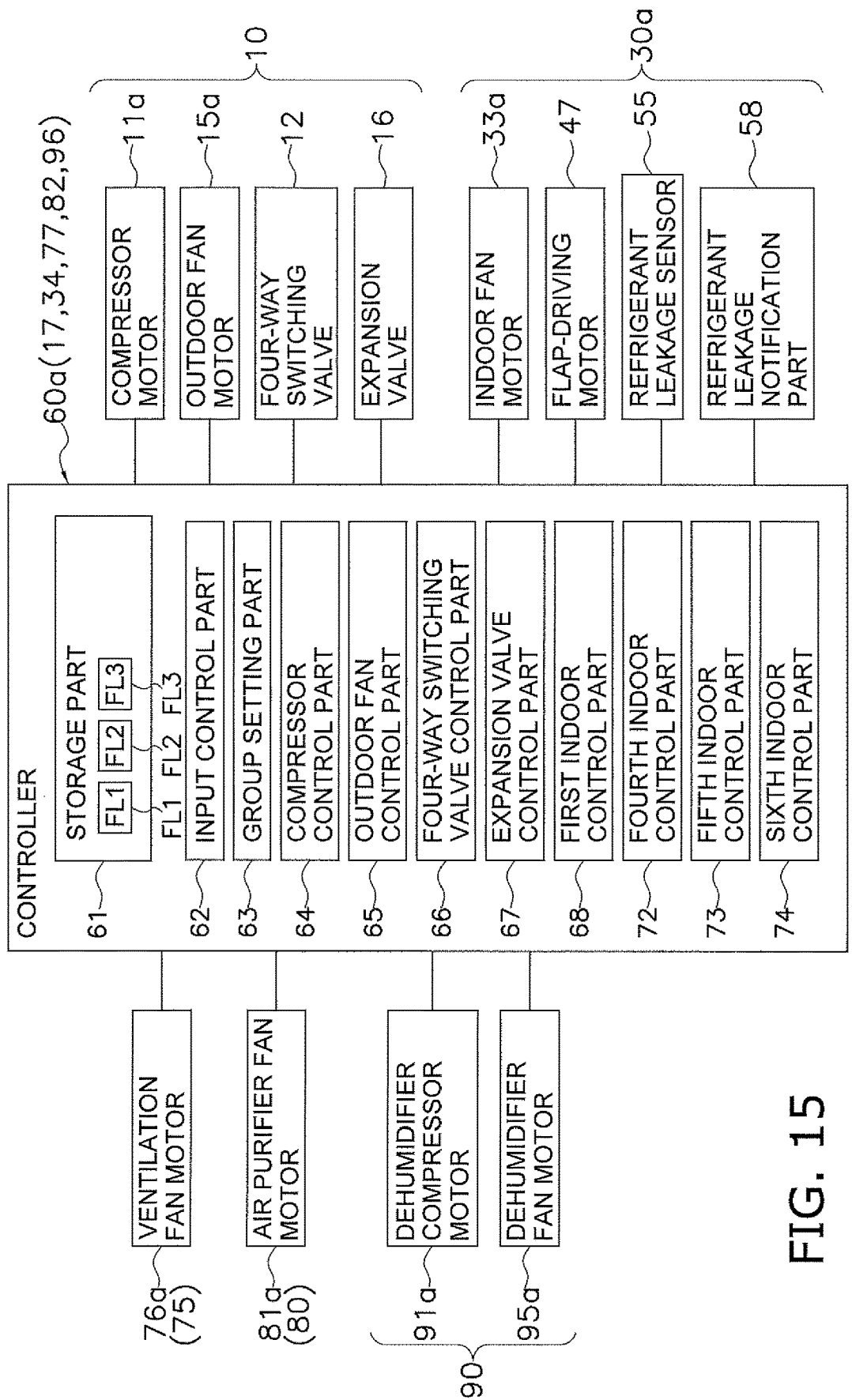
FIG. 15 is a block diagram schematically showing the configuration of a controller in the air-conditioning system according to the fourth embodiment of the present invention, and the units connected to the controller.

FIG. 15 is a block diagram schematically showing the configuration of the controller 60a and the units connected to the controller 60a. The controller 60a is configured by the outdoor unit control part 17, the indoor unit control parts 34, the ventilator control part 77, the air purifier control part 82, and the dehumidifier control part 96 being connected through communication lines. Because the controller 60a has a large section in common with the controller 60, the section that differs from the controller 60 is described below.

The controller 60a is electrically connected with the ventilation fan motor 76a, the air purifier fan motor 81a, the dehumidifier compressor motor 91a, and the dehumidifier fan motor 95a. Additionally, in the controller 60a, a grouping table TB2 of a format such as that shown in, e.g., FIG. 16, is created by the group setting part 63 and stored in the storage part 61. Additionally, the controller 60a includes a fourth indoor control part 72, a fifth indoor control part 73, and a sixth indoor control part 74 instead of the second indoor control part 69 and the third indoor control part 70.

(1-5-1) Grouping Table TB2

In the grouping table TB2, the values of variables ("unit number," "group number," and "emergency group number") are defined for each air-conditioning indoor unit, as in the grouping table TB1.

For the indoor unit 30a in the grouping table TB2 shown in FIG. 16, the value ("1") of the unit number specifying that the unit is an air-conditioning indoor unit is defined, the value of the group number to which the unit belongs is defined as "1," and the value of the emergency group number is defined as "5." Additionally, for the ventilator 75, the value ("2") of the unit number specifying that the device is a ventilator is defined, the value of the group number to which the device belongs is defined as "2," and the value of the emergency group number, as with the indoor unit 30a, is defined as "5." Additionally, for the air purifier 80, the value ("3") of the unit number specifying that the device is an air purifier is defined, the value of the group number to which the device belongs is defined as "3," and the value of the emergency group number, as with the indoor unit 30a, is defined as "5." Additionally, for the dehumidifier 90, the value ("4") of the unit number specifying that the device is a dehumidifier is defined, the value of the group number to which the device belongs is defined as "4," and the value of the emergency group number, as with the indoor unit 30a, is defined as "5."

(1-5-2) Fourth Indoor Control Part 72, Fifth Indoor Control Part 73, Sixth Indoor Control Part 74

The fourth indoor control part 72, the fifth indoor control part 73, and the sixth indoor control part 74 are functional parts that control the actions of the corresponding air-conditioning indoor units (75, 80, or 90). Specifically, the fourth indoor control part 72 corresponds to the ventilator 75, the fifth indoor control part 73 corresponds to the air purifier 80, and the sixth indoor control part 74 corresponds to the dehumidifier 90.

The fourth indoor control part 72, the fifth indoor control part 73, and the sixth indoor control part 74 refer as appropriate to the command discerning flag FL1, the situation discerning flag FL3, and the grouping table TB1, and in accordance with the situation, control the actions of the actuators in the corresponding air-conditioning indoor units (e.g. the ventilation fan 76 (ventilation fan motor 76a), the air purifier fan 81 (air purifier fan motor 81a), the dehumidifier compressor 91 (dehumidifier compressor motor 91a) or the dehumidifier fan 95 (dehumidifier fan motor 95a)) on the basis of command information.

For example, the fourth indoor control part 72, the fifth indoor control part 73, and the sixth indoor control part 74 activate the actuators on the basis of command information, when a command pertaining to the corresponding air-conditioning indoor unit is inputted via a remote controller 50 or the like.

Additionally, when another air-conditioning indoor unit belonging to the same group (i.e., having the same group number) goes into the operating state, each of the fourth indoor control part 72, the fifth indoor control part 73, and the sixth indoor control part 74 activates the corresponding air-conditioning indoor unit. Due to this action, when an operation start command is inputted to any air-conditioning indoor unit among the plurality of air-conditioning indoor units of the same group, the other air-conditioning indoor units also go into the operating state, and coordinated control is achieved.

Additionally, when the corresponded bit in the refrigerant leakage discerning flag FL2 is set (i.e., when a refrigerant leakage signal is sent from a refrigerant leakage sensor 55 to the corresponding air-conditioning indoor unit), each of the fourth indoor control part 72, the fifth indoor control part 73, and the sixth indoor control part 74 causes the air blower (76, 81, or 95) to be driven at the first rotation speed.

Additionally, when another bit in the refrigerant leakage discerning flag FL2 is set (i.e., when a refrigerant leakage signal is sent from a refrigerant leakage sensor 55 to an air-conditioning indoor unit other than the corresponding air-conditioning indoor unit), each of the fourth indoor control part 72, the fifth indoor control part 73, and the sixth indoor control part 74 refers to the grouping table TB2, and causes the air blower (76, 81, or 95) to be driven at the second rotation speed when the refrigerant leakage signal has been sent to an air-conditioning indoor unit sharing the same emergency group number.

Due to these actions, in the air-conditioning system 100c, when a refrigerant leakage signal is sent from a refrigerant leakage sensor 55 to any air-conditioning indoor unit of a plurality of air-conditioning indoor units (30a, 75, 80, 90) sharing the same emergency group number, not only the air blower (33a, 76, 81, or 95) in that air-conditioning indoor unit being driven at the first rotation speed, but also the air blower in the other air-conditioning indoor unit is driven at the second rotation speed. In the present embodiment, because the indoor unit 30a, the ventilator 75, the air purifier 80, and the dehumidifier 90 all have the same emergency group number, when a refrigerant leakage signal is sent from a refrigerant leakage sensor 55 to any air-conditioning indoor unit, the air blowers are driven in all of the air-conditioning indoor units. Specifically, when refrigerant leakage has occurred in the target space SP, air flow is generated by each of the air-conditioning indoor units.

In the present embodiment, both the first rotation speed and the second rotation speed are set to a maximum speed (a rotation speed at which the airflow volume of air flow AF, the ventilating air flow, the air-purifying air flow, or the dehumidifying air flow reaches a maximum).

(2) Characteristics

The air-conditioning system 100c is configured so that when refrigerant leakage has occurred in the target space SP, in the air-conditioning indoor units, the air blowers are driven at a predetermined speed. As a result, when refrigerant leakage has occurred, a plurality of air flows are generated, and the refrigerant leakage is dispersed by the generated plurality of air flows. Consequently, leaked refrigerant dispersal is facilitated in the target space SP, and accumulation of the leaked refrigerant in some of the target space SP is suppressed. Specifically, increases in leaked refrigerant concentration in specific sections of the target space SP are suppressed. Therefore, security relating to refrigerant leakage is ensured.

In the air-conditioning system 100c, the indoor unit 30a, the ventilator 75, the air purifier 80, and the dehumidifier 90 could all be refrigerant-leaking indoor unit. Specifically, the indoor unit 30a, the ventilator 75, the air purifier 80, and the dehumidifier 90 are all equivalent to the "first indoor unit" in the claims.

(3) Modifications

The fourth embodiment described above can be modified as appropriate as shown in the following modifications. These modifications may be combined and applied with other modifications as long as no contradictions arise.

(3-1) Modification 4A

The air-conditioning system 100c had, as air-conditioning indoor units, the ventilator 75, the air purifier 80, and the dehumidifier 90, which are separate from the indoor unit 30a. However, the air-conditioning system 100c need not have the ventilator 75, the air purifier 80, and the dehumidifier 90 as air-conditioning indoor units; any of these units can be omitted as appropriate. Additionally, the air-conditioning system 100c may have other air-conditioning indoor units (e.g., a circulator etc.) as air-conditioning indoor units.

(3-2) Modification 4B

In the air-conditioning system 100c, the refrigerant leakage sensor 55 is connected only to the indoor unit control part 34, but may also be connected to any/all of the ventilator control part 77, the air purifier control part 82, and the dehumidifier control part 96, and may be configured so as to send the refrigerant leakage signal to the air-conditioning indoor unit connected thereto.

(3-3) Modification 4C

In the air-conditioning system 100c, all of the air-conditioning indoor units are defined with the same emergency group number and are controlled in coordinated control when refrigerant leakage occurred, but all of the air-conditioning indoor units need not be defined with the same emergency group number; and alterations can be made, as appropriate, in accordance with the environment where the system is installed.

INDUSTRIAL APPLICABILITY

The present invention can be applied to an air-conditioning system.

REFERENCE SIGNS LIST

10 Outdoor unit (outdoor unit)
10a, 10b Outdoor unit (first outdoor unit, second outdoor unit)
13 Outdoor heat exchanger
17 Outdoor unit control part
30, 30a, 30b, 30c Indoor unit (air-conditioning indoor unit, first indoor unit)
33 Indoor fan (air blower)
33a Indoor fan motor
34 Indoor unit control part
45 Flap
50 Remote controller
55 Refrigerant leakage sensor
58 Refrigerant leakage notification part
60, 60a Controllers
75 Ventilator (air-conditioning indoor unit, first indoor unit)
76 Ventilation fan (air blower)
76a Ventilation fan motor
77 Ventilator control part
80 Air purifier (air-conditioning indoor unit, first indoor unit)
81 Air purifier fan (air blower)
81a Air purifier fan motor
82 Air purifier control part
90 Dehumidifier (air-conditioning indoor unit, first indoor unit)
95 Dehumidifier fan (air blower)
95a Dehumidifier fan motor
96 Dehumidifier control part
100, 100a, 100b, 100c Air-conditioning systems
341 Switching part
AC1 Air-conditioning unit
AF Air flow
FL1 Command discerning flag
FL2 Refrigerant leakage discerning flag
FL3 Situation discerning flag
GP Gas interconnection pipe
LP Liquid interconnection pipe
GP1, GP2 Gas interconnection pipes (first refrigerant interconnection pipe, second refrigerant interconnection pipe)
LP1, LP2 Liquid interconnection pipes (first refrigerant interconnection pipe, second refrigerant interconnection pipe)
RC, RC' Refrigerant circuits
RC1, RC2 Refrigerant circuits (first refrigerant circuit, second refrigerant circuit)
SP, SP1, SP2 Target spaces
SW1 Switch
TB1, TB2 Grouping tables
cb1 Communication line

CITATION LIST

Patent Literature

[Patent Literature 1] Japanese Laid-open Patent Publication No. 2012-13348

The invention claimed is:

1. An air-conditioning system comprising:
a plurality of air-conditioning indoor units including a first indoor unit installed in a target space;
a controller configured and arranged to control actions of the plurality of air-conditioning indoor units;
a refrigerant leakage sensor configured and arranged to sense refrigerant leakage in the target space; and
a remote controller configured and arranged to be inputted by a user a command designating the air-conditioning indoor unit of which the air blower will be driven when refrigerant leakage occurs,
each of the air-conditioning indoor units having an air blower;
the controller configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage; and
the controller being configured and arranged to cause the air blower of the air-conditioning indoor unit designated in the command to be driven when the refrigerant leakage sensor has sensed refrigerant leakage.

2. The air-conditioning system according to claim 1, further comprising
an outdoor unit placed outside of the target space;
the plurality of air-conditioning indoor units including the first indoor unit being connected with the outdoor unit via refrigerant interconnection pipes, and configured and arranged to form a refrigerant circuit together with the outdoor unit.

3. The air-conditioning system according to claim 2, further comprising a first outdoor unit and a second outdoor unit, including an outdoor heat exchanger configured and arranged to function as a condenser or evaporator of refrigerant;
the first indoor unit being connected with the first outdoor unit via a first refrigerant interconnection pipe, and configured and arranged to form a first refrigerant circuit together with the first outdoor unit; and
the air-conditioning indoor unit other than the first indoor unit being connected with the second outdoor unit via a second refrigerant interconnection pipe, and configured and arranged to form a second refrigerant circuit together with the second outdoor unit.

4. The air-conditioning system according to claim 2, wherein the controller is configured and arranged to cause the air blowers of the air-conditioning indoor units installed in the target space to be driven when the refrigerant leakage sensor has sensed refrigerant leakage.

5. The air-conditioning system according to claim 2, wherein the controller is configured and arranged to cause the air blowers of all of the air-conditioning indoor units to be driven when the refrigerant leakage sensor has sensed refrigerant leakage.

6. The air-conditioning system according to claim 1, further comprising a first outdoor unit and a second outdoor unit, including an outdoor heat exchanger configured and arranged to function as a condenser or evaporator of refrigerant;

the first indoor unit being connected with the first outdoor unit via a first refrigerant interconnection pipe and configured and arranged to form a first refrigerant circuit together with the first outdoor unit; and the air-conditioning indoor unit other than the first indoor unit being connected with the second outdoor unit via a second refrigerant interconnection pipe, and configured and arranged to form a second refrigerant circuit together with the second outdoor unit.

7. The air-conditioning system according to claim 6, wherein the controller is configured and arranged to cause the air blowers of the air-conditioning indoor units installed in the target space to be driven when the refrigerant leakage sensor has sensed refrigerant leakage.

8. The air-conditioning system according to claim 6, wherein the controller is configured and arranged to cause the air blowers of all of the air-conditioning indoor units to be driven when the refrigerant leakage sensor has sensed refrigerant leakage.

9. The air-conditioning system according to claim 1, wherein the controller is configured and arranged to cause the air blowers of the air-conditioning indoor units installed in the target space to be driven when the refrigerant leakage sensor has sensed refrigerant leakage.

10. The air-conditioning system according to claim 9, wherein the controller is configured and arranged to cause the air blowers of all of the air-conditioning indoor units to be driven when the refrigerant leakage sensor has sensed refrigerant leakage.

11. The air-conditioning system according to claim 1, wherein the controller is configured and arranged to cause the air blowers of all of the air-conditioning indoor units to be driven when the refrigerant leakage sensor has sensed refrigerant leakage.

12. An air-conditioning system comprising:
a plurality of air-conditioning indoor units including a first indoor unit installed in a target space;
a controller configured and arranged to control actions of the plurality of air-conditioning indoor units;
a refrigerant leakage sensor configured and arranged to sense refrigerant leakage in the target space; and
a switching part configured and arranged to select due to being mechanically switched by a user the air-conditioning indoor unit of which the air blower will be driven when refrigerant leakage occurs;
the controller configured and arranged to cause the air blower of the air-conditioning indoor unit selected in the switching part to be driven when the refrigerant leakage sensor has sensed refrigerant leakage;
each of the air-conditioning indoor units having an air blower; and
the controller configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage.

13. An air-conditioning system comprising:
a plurality of air-conditioning indoor units including a first indoor unit installed in a target space;
a controller configured and arranged to control actions of the plurality of air-conditioning indoor units;
a refrigerant leakage sensor configured and arranged to sense refrigerant leakage in the target space;
an outdoor unit placed outside of the target space; and
a remote controller configured and arranged to be inputted by a user a command designating the air-conditioning indoor unit of which the air blower will be driven when refrigerant leakage occurs,
each of the air-conditioning indoor units having an air blower;
the controller configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage;
the plurality of air-conditioning indoor units including the first indoor unit being connected with the outdoor unit via refrigerant interconnection pipes, and configured and arranged to form a refrigerant circuit together with the outdoor unit; and
the controller being configured and arranged to cause the air blower of the air-conditioning indoor unit designated in the command to be driven when the refrigerant leakage sensor has sensed refrigerant leakage.

14. An air-conditioning system comprising:
a plurality of air-conditioning indoor units including a first indoor unit installed in a target space;
a controller configured and arranged to control actions of the plurality of air-conditioning indoor units;
a refrigerant leakage sensor configured and arranged to sense refrigerant leakage in the target space;
a first outdoor unit and a second outdoor unit, including an outdoor heat exchanger configured and arranged to function as a condenser or evaporator of refrigerant; and
a remote controller configured and arranged to be inputted by a user a command designating the air-conditioning indoor unit of which the air blower will be driven when refrigerant leakage occurs,
each of the air-conditioning indoor units having an air blower;
the controller configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage;
the first indoor unit being connected with the first outdoor unit via a first refrigerant interconnection pipe and configured and arranged to form a first refrigerant circuit together with the first outdoor unit;
the air-conditioning indoor unit other than the first indoor unit being connected with the second outdoor unit via a second refrigerant interconnection pipe, and configured and arranged to form a second refrigerant circuit together with the second outdoor unit; and
the controller being configured and arranged to cause the air blower of the air-conditioning indoor unit designated in the command to be driven when the refrigerant leakage sensor has sensed refrigerant leakage.

15. An air-conditioning system comprising:
a plurality of air-conditioning indoor units including a first indoor unit installed in a target space;
a controller configured and arranged to control actions of the plurality of air-conditioning indoor units;

a refrigerant leakage sensor configured and arranged to sense refrigerant leakage in the target space;

an outdoor unit placed outside of the target space; and a switching part configured and arranged to select due to being mechanically switched by a user the air-conditioning indoor unit of which the air blower will be driven when refrigerant leakage occurs;

each of the air-conditioning indoor units having an air blower;

the controller configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage;

the plurality of air-conditioning indoor units including the first indoor unit being connected with the outdoor unit via refrigerant interconnection pipes, and configured and arranged to form a refrigerant circuit together with the outdoor unit; and the controller being configured and arranged to cause the air blower of the air-conditioning indoor unit selected in the switching part to be driven when the refrigerant leakage sensor has sensed refrigerant leakage.

16. An air-conditioning system comprising:

a plurality of air-conditioning indoor units including a first indoor unit installed in a target space;

a controller configured and arranged to control actions of the plurality of air-conditioning indoor units;

a refrigerant leakage sensor configured and arranged to sense refrigerant leakage in the target space;

a first outdoor unit and a second outdoor unit, including an outdoor heat exchanger configured and arranged to function as a condenser or evaporator of refrigerant; and a switching part configured and arranged to select due to being mechanically switched by a user the air-conditioning indoor unit of which the air blower will be driven when refrigerant leakage occurs;

each of the air-conditioning indoor units having an air blower;

the controller configured and arranged to cause the air blower of the first indoor unit to be driven at a predetermined first rotation speed and cause the air blower of air-conditioning indoor unit other than the first indoor unit to be driven at a predetermined second rotation speed when the refrigerant leakage sensor has sensed refrigerant leakage;

the first indoor unit being connected with the first outdoor unit via a first refrigerant interconnection pipe and configured and arranged to form a first refrigerant circuit together with the first outdoor unit;

the air-conditioning indoor unit other than the first indoor unit being connected with the second outdoor unit via a second refrigerant interconnection pipe, and configured and arranged to form a second refrigerant circuit together with the second outdoor unit; and the controller being configured and arranged to cause the air blower of the air-conditioning indoor unit selected in the switching part to be driven when the refrigerant leakage sensor has sensed refrigerant leakage.

\* \* \* \* \*